(12) United States Patent
Graff

(10) Patent No.: US 7,095,333 B2
(45) Date of Patent: Aug. 22, 2006

(54) METHOD AND APPARATUS FOR ENABLING OPTICAL COMMUNICATION THROUGH LOW INTENSITY INDICATORS IN AN APPLIANCE THAT USES A VACUUM FLUORESCENT DISPLAY

(75) Inventor: Timothy E. Graff, Crystal Lake, IL (US)

(73) Assignee: Emerson Electric Company, St. Louis, MO (US)

(*) Notice: Subject to any disclaimer, the term of this patent is extended or adjusted under 35 U.S.C. 154(b) by 348 days.

(21) Appl. No.: 10/667,020

(22) Filed: Sep. 18, 2003

(65) Prior Publication Data

US 2005/0073422 A1    Apr. 7, 2005

(51) Int. Cl.
*G08B 5/00* (2006.01)
(52) U.S. Cl. ............................... 340/815.4; 340/815.5; 356/219
(58) Field of Classification Search ............. 340/815.4, 340/539.24, 815.5; 356/342, 219
See application file for complete search history.

(56) References Cited

U.S. PATENT DOCUMENTS

| 4,023,887 | A |   | 5/1977 | Speers |
| 4,634,845 | A |   | 1/1987 | Hale et al. |
| 5,345,230 | A | * | 9/1994 | Jackson et al. ............ 340/3.51 |
| 5,359,273 | A |   | 10/1994 | Flückiger |
| 5,689,168 | A |   | 11/1997 | Bogwicz et al. |
| 5,870,035 | A |   | 2/1999 | Bjernulf |
| 5,963,145 | A |   | 10/1999 | Escobosa |
| 6,369,924 | B1 |   | 4/2002 | Scharf et al. |
| 6,462,328 | B1 |   | 10/2002 | Toyoda |
| 6,507,022 | B1 |   | 1/2003 | Salmond et al. |
| 6,528,808 | B1 |   | 3/2003 | Takiguchi |
| 6,530,784 | B1 |   | 3/2003 | Yim et al. |
| 2002/0190956 | A1 |   | 12/2002 | Klein et al. |

FOREIGN PATENT DOCUMENTS

| DE | 1 106 395 | 5/1961 |
| DE | 1 690 321 | 5/1971 |
| DE | 100 35 642 | 12/2001 |
| EP | 0 394 177 | 10/1990 |
| EP | 0 396 915 | 11/1990 |
| EP | 0 898 003 | 2/1999 |
| GB | 2 343 996 | 5/2000 |

* cited by examiner

*Primary Examiner*—Toan N. Pham
(74) *Attorney, Agent, or Firm*—Maginot Moore & Beck

(57) ABSTRACT

An optical interface using indicator lights is provided for an appliance having a vacuum fluorescent display (VFD) by mounting the indicator lights behind a VFD. In a VFD having a dark background, apertures are formed in the VFD so the indicator lights are enabled for optical communication through the VFD. Preferably, the apertures are formed in the dark layer covering a glass substrate in the VFD so the dark layer helps absorb reflected light that may cause optical noise in the light signals being communicated. Each aperture may be located equidistantly from a group of four pixels in the VFD.

20 Claims, 15 Drawing Sheets

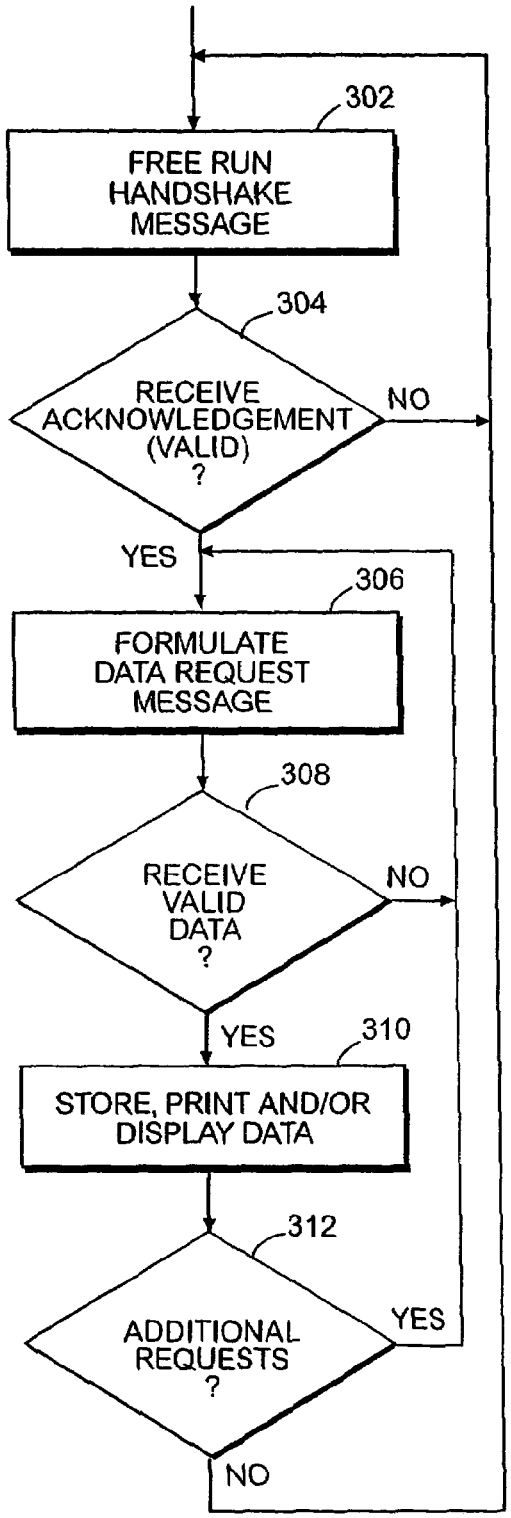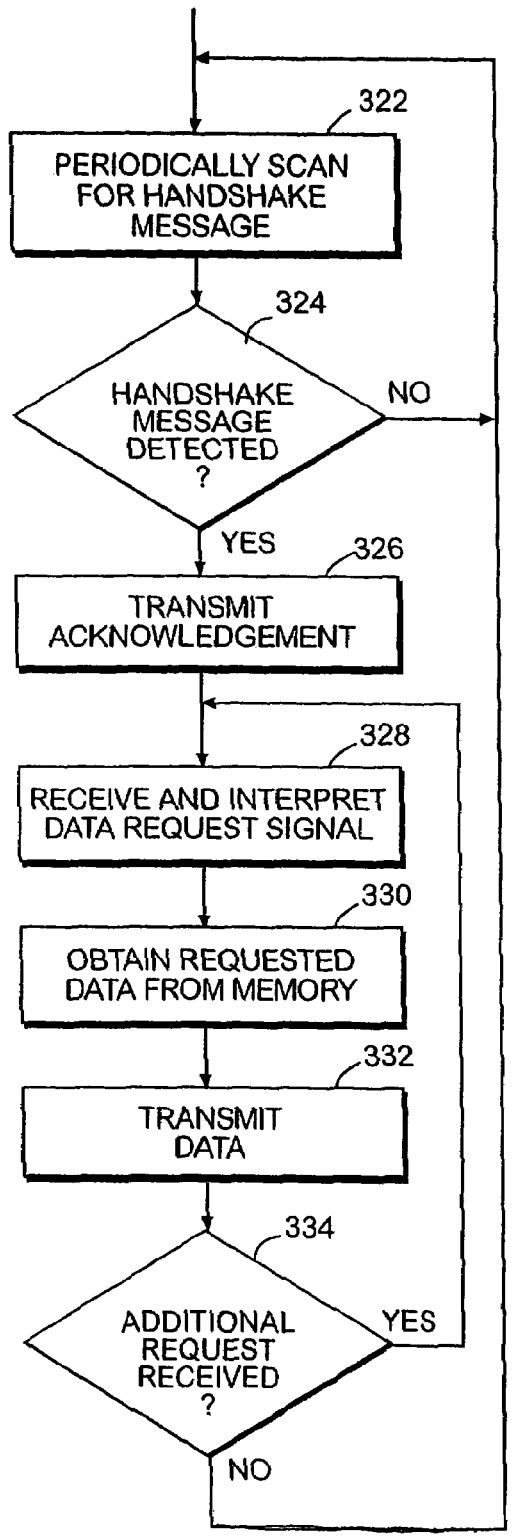
FIG 13     FIG 14

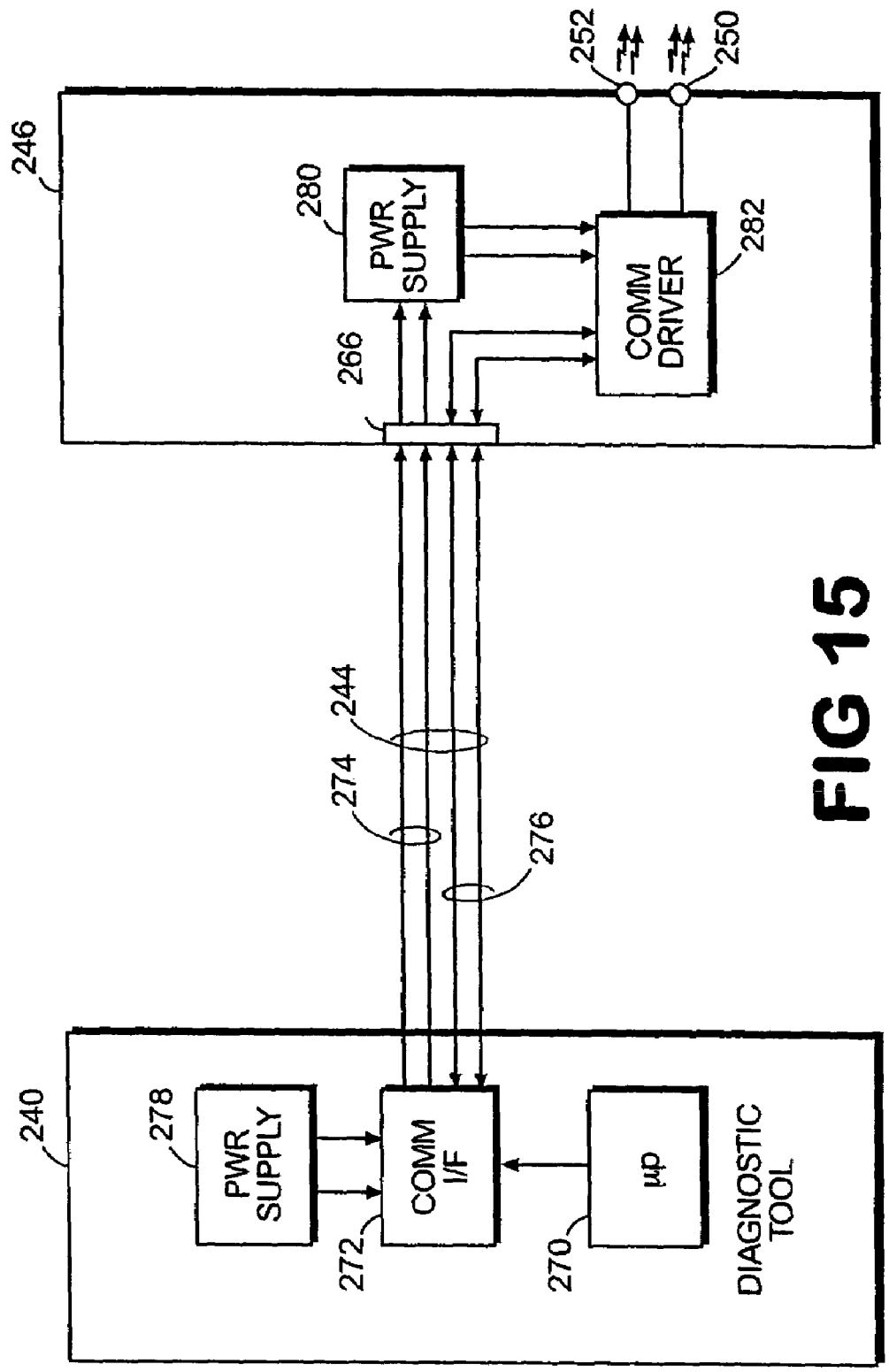

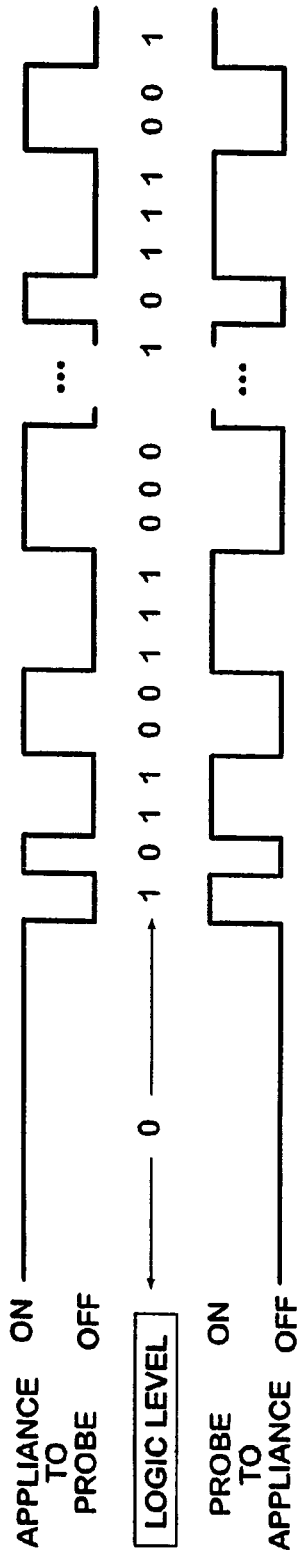

METHOD AND APPARATUS FOR ENABLING OPTICAL COMMUNICATION THROUGH LOW INTENSITY INDICATORS IN AN APPLIANCE THAT USES A VACUUM FLUORESCENT DISPLAY

This application cross-references U.S. Provisional Patent Application Ser. No. 60/351,348, filed Jan. 24, 2002, and U.S. patent application Ser. No. 10/264,888, entitled "Appliance Control Communication Methods and Apparatus" and filed on Oct. 4, 2002, U.S. patent application Ser. No. 10/348,305 entitled "System and Method for Communication with an Appliance Through a Light Emitting Diode" and filed on Jan. 21, 2003, and U.S. patent application Ser. No. 10/602,933 entitled "System and Method for Communicating with an Appliance Through an Optical Interface Using a Control Panel Indicator," and filed on Jun. 24, 2003, all of which are hereby expressly incorporated in their entireties by reference.

FIELD OF THE INVENTION

The present invention relates generally to optical communication devices, and more particularly, to optical communication devices that use low intensity light signals for communication.

BACKGROUND OF THE INVENTION

Appliance devices such as dishwashers, clothing washing machines, dryers, ovens, refrigerators and the like often include electrical control circuits. Such control circuits receive input from the user and control the operation of the appliance device based on the received input. In many cases, the overall operation of the appliance is predefined as a general matter and the user input merely modifies the predefined operation in some way.

For example, the operation of a dishwasher typically involves the processes of filling, washing, draining and rinsing. Such operations involve, among other things, the control of water valves, detergent valves and motor relays. The general sequence of such operations is generally predefined. However, user input may be used to alter the sequence, or to define certain parameters of the sequence. For example, the user input may define whether the wash cycle is normal, light, or heavy. Although the general sequence does not necessarily change dependent upon wash cycle selection, the length of certain processes within the sequence does change.

A typical user input interface for a dishwasher includes a rotary knob and a plurality of pushbutton switches. The rotary knob is attached to a cam that controls the sequence of operations within the dishwasher. The cam has a number of followers that trigger the operation of the various dishwasher components. The cam followers are positioned to cause various operations to be executed in a "programmed" sequence. The user selects a particular cycle by rotating the knob to particular position associated with the selected cycle. Upon actuation, the cam begins to rotate automatically started from the user selected position, performing each operation as defined on the cam "program" from the user-selected point forward. The pushbutton switches are used to activate/deactivate various options that are not available through the cam program. For example, pushbutton switches may be used to selectively activate a heated dry cycle, a delayed start, or a high temperature wash.

More recently, electronic controllers, for example, microprocessors and microcontrollers, have replaced the rotary cam control device. The use of electronic controllers provides flexibility and features not typically available in cam control devices. Moreover, as a general matter, replacement of moving parts, such as electromechanical rotating cams, typically increases reliability in products.

However, the use of electronic controllers has added to the complexity of servicing appliances. Small electronic integrated circuits do not lend themselves to the methods of troubleshooting and repair that have historically been used with mechanical and electromechanical devices. Accordingly, malfunctions in an electronically controlled appliance are more difficult to diagnose and resolve than those of the old, mechanical cam controlled devices.

U. S. patent application Ser. No. 10/264,888, assigned to the assignee of the present invention, discloses a diagnostic tool that utilizes an optical transmitter and an optical receiver in a communication probe for bi-directional communication with an appliance controller through an indicator light of the appliance control panel and an optical detector on an external panel of the appliance. The ability to obtain data information from an electronic controller may be used to obtain diagnostic, operational, or test data from the controller regarding the operation of the appliance.

The optical interface of the above-referenced patent application requires an indicator light that is optically accessible from the surface of the control panel of the appliance. However, a growing number of appliances are using vacuum fluorescent displays (VFD) that do not have indicator lights. A VFD is a display having a glass substrate to which semiconductor circuits and phosphor pixels are mounted. The semiconductor circuits are used to selectively excite the pixels to form displays containing information regarding the operation of the appliance. Typically, a dark layer is interposed between the glass substrate and the phosphor pixels to provide contrast and enhance the visibility of the displayed information.

While appliances with VFDs provide more information in a more visually esthetic manner than indicator lights, the light generated by a VFD may not be adequate for optical communication with a diagnostic tool. If an indicator light is added to the control panel of an appliance having a VFD then a hole must be drilled or otherwise provided in the control panel. This manufacturing operation adds costs to the production of the appliance. Additionally, placement of one or more indicator lights to operate as an optical transmitter or optical receiver outside the display region occupied by a VFD may place the indicator lights in a region of the control panel that is highly reflective. For example, many appliances are white in color and indicator lights surrounded by a white reflective surface may be more susceptible to optical noise arising from reflected light. Consequently, a need exists for provision of indicator lights to operate as optical communication devices on an appliance having a VFD in a manner that reduces the risk of optical noise arising from reflected light.

SUMMARY OF THE INVENTION

The present invention addresses the above needs, as well as others, by providing an optical interface for an appliance having a vacuum fluorescent display (VFD) by mounting indicator lights behind the VFD and forming apertures in the VFD so the indicator lights are optically accessible through the VFD. The optical interface of the present invention includes a vacuum fluorescent display, a first indicator light mounted behind the vacuum fluorescent display, and a first aperture in the vacuum fluorescent display and aligned with the indicator light so that the first indicator light may be operated as an optical communication device for optical communication through the vacuum fluorescent display. For a VFD having a dark layer covering the glass substrate of the VFD, the aperture is formed in the dark layer.

Preferably, the optical interface of the present invention includes a second indicator light mounted behind the VFD and a second aperture in the VFD that is aligned with the second indicator light so that the second indicator light may be operated as an optical communication device for optical communication through the VFD. Preferably, one of the first and the second indicator lights are operated as an optical transmitter and the other is operated as an optical receiver. Each aperture is preferably located within a group of four pixels so the aperture is equidistant from each pixel within the group.

The above described features and advantages, as well as others, will become more readily apparent to those of ordinary skill in the art by reference to the following detailed description and accompanying drawings.

BRIEF DESCRIPTION OF THE DRAWINGS

FIG. 13 shows a flow diagram of an exemplary set of operations of the diagnostic tool of FIG. 11;

FIG. 14 shows a flow diagram of an exemplary set of operations of the controller of the dishwasher circuit of FIG. 2 in communication with the diagnostic tool of FIG. 11;

FIG. 15 is a block diagram of the diagnostic tool and communication probe of FIG. 11;

FIG. 18 is a diagram that depicts an optical signal exchanged between the control panel of FIG. 4 and the communication probe of FIG. 12 that has an opposite logical polarity;

FIG. 19 is a diagram that depicts an optical signal exchanged between the control panel of FIG. 4 and the communication probe of FIG. 12 that has an opposite no-data present signal but the same logical polarity according to another embodiment of the present invention;

DETAILED DESCRIPTION

Figure 1:
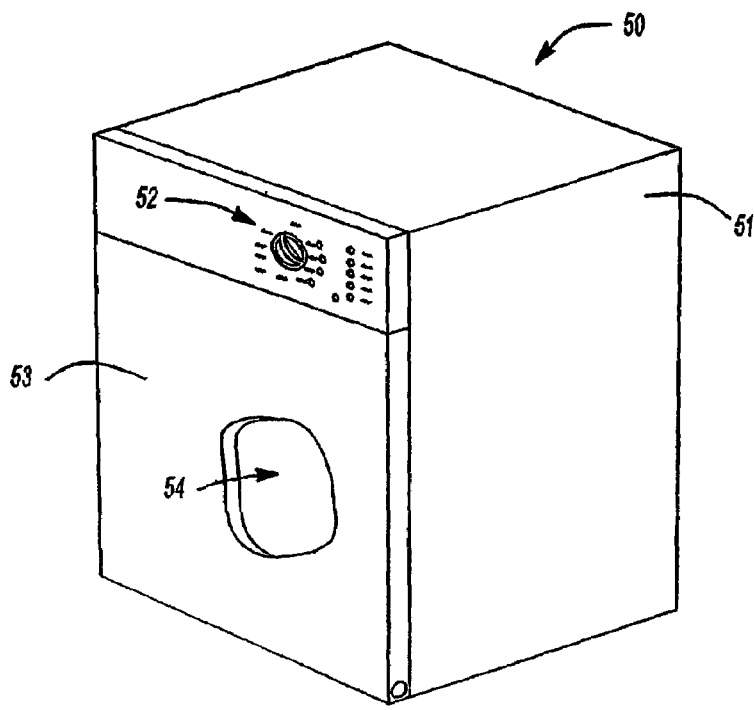
FIG. 1 shows a perspective, partially cutaway view of an exemplary dishwasher in which one or more features of the present invention may be incorporated.

FIG. 1 shows an exemplary embodiment of a dishwasher 50 in which one or more aspects of the present invention may be incorporated. The dishwasher 50 includes a frame 51, a control panel 52, a door 53, and a tub 54. The door 53 is pivotally attached to the frame 51. The door 53 and frame 51 define an enclosure in which is located the tub 54. The control panel 52 is affixed to the frame 51. The enclosure formed by the door 53 and the frame 51 also houses control circuits and devices as is known in the art. The exact physical arrangements of the door 53, frame 51 and tub 54 are a matter of design choice. For example, the control panel 52 may be mounted on the door 53 in some embodiments.

Figure 2:
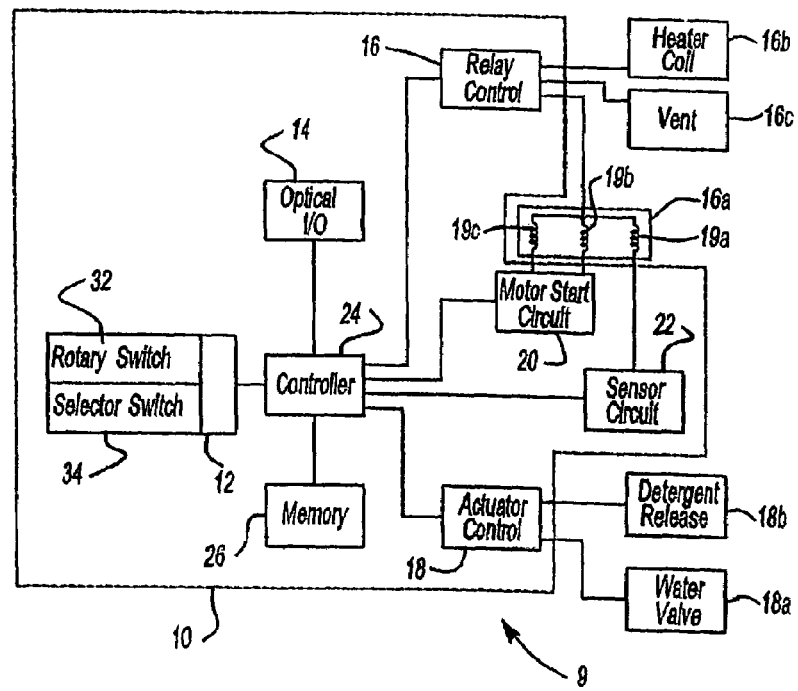
FIG. 2 shows a schematic block diagram of an exemplary appliance circuit that incorporates one or more features of the present invention.

FIG. 2 shows a schematic block diagram of an exemplary appliance circuit 9 that incorporates one or more features of the present invention. The appliance circuit 9 includes a control circuit 10 and a set of electromechanical devices. In the exemplary embodiment described herein, the electromechanical devices include a motor 16a, a heater coil 16b, a vent 16c, a water valve solenoid 18a, and a detergent release actuator 18b. Such electromechanical devices are arranged within the frame and/or tub of a dishwasher such as the dishwasher 50 of FIG. 1 with other mechanical devices such as pumps, rotating water sprayers, dish racks and the like as is well known in the art. The exact arrangement of the electromechanical devices and mechanical devices is a matter of design choice.

The appliance control circuit 10 controls the operation of one or more of the electromechanical devices as to carry out one or more appliance operations. In the exemplary embodiment described herein, the appliance control circuit 10 controls the operation of the devices that cooperate to perform dishwashing operations. However, it will be appreciated that the principles of the present invention may readily be adapted for use in clothes washing machines, clothes dryers, as well as other appliance devices.

The dishwasher control circuit 10 of FIG. 2 includes a switch input circuit 12, an optical input/output ("I/O") circuit 14, a relay control circuit 16, a valve control circuit 18, a motor start circuit 20, a sensor circuit 22, a controller 24, and a memory 26.

The switch input circuit 12 includes a rotating position switch 32 and a selector switch 34. In accordance with the present invention, the rotating position switch 34 has a first position associated with a first appliance function. For example, the first position may be a position in which a first washing cycle is selected from a plurality of possible washing cycles. In accordance with one aspect of the present invention, the rotating position switch 32 further includes a second position associated with a second appliance function, the second appliance function modifying the first appliance function. For example, the second position may select from one or more user options, such as delayed start, a forced air drying cycle, or the like. The selector switch 34 is a switch that may be manipulated to an actuated state. The selector switch 34 in the actuated state is configured to generate a signal representative of a selection of the first appliance function when the rotating position switch is in the first position. The selector switch 34 in the actuated state is further configured to generate a signal representative of a selection of the second appliance function when the rotating position switch is in the second position.

The rotating position switch 32 and the selector switch 34 may take a variety of forms. Exemplary embodiments of the rotating position switch 32 and the selector switch 34 are described below in connection with FIG. 4. In general, however, the rotating position switch 32 includes a plurality of rotational positions in which user cycle selections may be identified by the user or operator, and the selector switch 34 is a device that actually causes an input signal based on the user selection to be communicated to the controller 24.

The optical I/O circuit 14 includes at least first and second optical communication devices, not shown in FIG. 2 (see, e.g., FIG. 9), that are in communication with an external surface of the appliance control panel. The first and second optical communication devices are operable to communicate diagnostic information between the controller 24 and an external device. In preferred embodiments, the optical I/O circuit 14 further includes a plurality of indicator lights that communicate information regarding the operation of the dishwasher to the human operator. In accordance with one aspect of the present invention, at least one of the optical communication devices also operates as an indicator light that communicates information to a human operator.

The relay control circuit 16 is a circuit that is configured to control the status of various relay contacts in accordance with control signals received from the controller 24. The relays may operate to activate and deactivate various appliance mechanisms, for example, the motor 16a, the heater coil 16b, and the vent fan 16c. An exemplary relay control circuit 16 is shown in further detail in FIG. 8, discussed further below.

The actuator control circuit 18 is a circuit that is configured to control the operation of one or more actuators in the dishwasher in accordance with signals received from the controller 24. In the exemplary embodiment described herein, the actuator control circuit 18 is configured to control the operation of a water valve solenoid 18a, and a detergent release mechanism 18b. Further detail regarding an exemplary embodiment of the actuator control circuit 18 is provided below in connection with FIG. 8.

The motor start circuit 20 is a circuit that is configured to control the start windings 19b and 19c of the motor 16a. In accordance with one aspect of the present invention, the motor start circuit 20 includes a current sense circuit (discussed in further detail below in connection with FIG. 8) that is operably coupled to the run winding 19a of the appliance motor 16a. The current sense circuit includes a sense resistor that is formed as an etched trace in a printed circuit board. The etched trace has a geometry that defines a resistance of the sense resistor. The current sense circuit, among other things, provides a mechanism by which information regarding the motor winding current may be obtained. Such information may be used for many purposes. For example, the motor winding current information may be used by the controller 24 to determine when to activate and de-activate the start windings 19b and 19c in the motor 16a. However, as will be discussed below, the controller 24 may also use the information from the current sense circuit to adjust water levels.

The sensor circuit 22 is a circuit that is configured to provide to the controller 24 electrical signals representative of a sensed condition of the dishwasher operation. For example, the sensor circuit 22 in the exemplary embodiment described herein includes a temperature sensor, a soil sensor, and a motor current sensor. Further detail regarding the sensor circuit 22 is provided below in connection with FIGS. 8 and 10.

The controller 24 is a processor-based control circuit that is operable to provide control signals to the relay control circuit 16, actuator control circuit 18, and the motor start circuit 20, responsive to input signals received from the switch input circuit 12 and the sensor circuit 22. The controller 24 may suitably include a microprocessor, a microcontroller, and/or other digital and analog control circuitry as well as incidental circuitry associated therewith. The controller 24 is preferably configured to perform operations based on program instructions stored in the memory 26 and/or memory internal to the controller 24.

The memory 26 comprises one or more electronic memory devices which may suitably include a read only memory, a random access memory ("RAM"), an electronically erasable programmable read only memory ("EEPROM"), other types of memory, or a combination of any of the above. In a preferred embodiment, the memory 26 includes a programmable non-volatile memory, for example, an EEPROM. Among other things, the memory 26 stores a calibration factor associated with the current sense resistor of the motor start circuit 20.

In the general operation of the dishwasher control circuit 10, an operator typically provides as input a first input signal representative of a select cycle operation of the dishwasher via the switch input circuit 12. For example, the first input signal may be one that corresponds to a request for a full wash cycle. The operator may also provide as a second input via the switch input circuit 12 a second input signal representative of an operation modification option, such as, for example, an additional heated dry cycle, or a delayed start. Most appliances, including dishwashers, clothes washing machine, clothes dryers and the like have commonly featured a main cycle selection that may be modified by one or more separate option selections.

In any event, the controller 24 receives the first input signal and, if applicable, the second input signal, and commences a dishwashing operation accordingly. In a typical wash cycle, the general cycle is as follows: 1) water fill, 2) spray water, 3) release detergent, 4) spray water, 5) drain water, 6) water fill, 7) spray water, and 8) drain water. It will be appreciated that the above cycle may readily be modified or altered as is known in the art.

Figure 3:
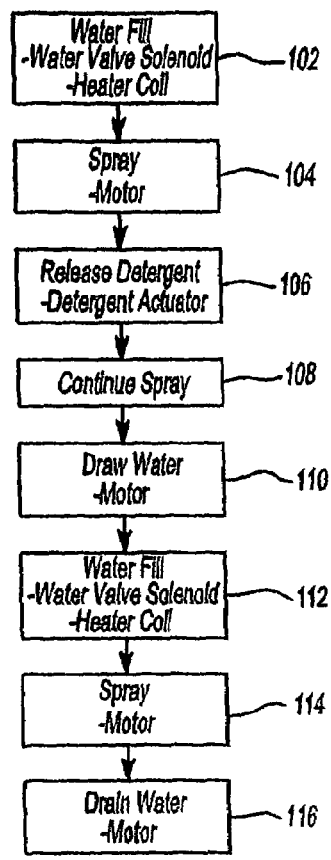
FIG. 3 shows a flow diagram of an exemplary set of operations performed by a controller of a dishwasher in accordance with the present invention.

FIG. 3 shows a flow diagram 100 of the exemplary set of operations performed by the controller 24 to effectuate a normal cycle operation of the dishwasher. It will be appreciated that the flow diagram 100 of FIG. 3 is given by way of example only, and that those of ordinary skill in the art may readily modify the flow diagram to suit their specific implementations. In addition, as discussed below in connection with FIG. 4, the operation of the flow diagram 100 may vary based on user input of cycle selection. Nevertheless, the flow diagram 100 illustrates the general operation of typical controller 24 of a dishwasher according to the invention.

In step 102, the controller 24 causes an initial water fill operation to take place. To this end, the controller 24 provides a signal to the actuator control circuit 18 that actuates the water valve solenoid 18a, thereby causing the water valve to open. The controller 24 further provides a signal to the relay control circuit 16 that energizes the heater coil 16b. The controller 24 then allows the water to fill for a predetermined amount of time. It is noted that the water pressure may be kept constant by a pressure sensitive valve, as is known in the art. Thus, the controller 24 effectively controls water the water level controlling the amount of time that the near constant flow of water is provided to the tub 54. The controller 24 also monitors, using sensor signals from the sensor circuit 22, the water temperature.

When the water level is adequate, then the controller 24 provides a signal to the actuator control circuit 18 that de-energizes the water valve solenoid 18a, thereby causing the water valve to close. When the water temperature is adequate, then the controller 24 provides a signal to the relay control circuit 16 that de-energizes the heater coil 16b.

In step 104, the controller causes a spray operation to occur. The spray operation is one in which the heated water within the dishwasher tub 54 is sprayed throughout the tub 54 onto the items to be cleaned. In step 104, the spray operation serves as a pre-rinse cycle. However, if detergent is placed loosely in the tub, then the spray operation of step 104 rinses and cleans simultaneously. To effectuate the spray cycle, the controller 24 provides a signal to the relay control circuit 16 that causes the run winding 19a of the motor 16a to be energized. The motor 16a drives the pump, not shown, that causes the water to be sprayed throughout the tub 54.

The controller 24 further provides a signal to the motor start circuit 20 that causes one of the start windings 19b or 19c to be energized. As is known in the art, it is advantageous to employ a separate start winding to bring a motor up to speed, and then de-energize the start winding once the motor reaches operating speed. Thereafter, only the run winding is energized during steady-state operation of the motor. Thus, the controller 24 provides a signal to the motor start circuit 20 that causes the start winding to be de-energized when the motor 16a reaches steady state. The controller 24 monitors the current using the current sense circuit (described above in connection with FIG. 2) to determine when the motor 16a is in steady-state.

In step 106, which occurs a predetermined time period after the start of step 104, the controller 24 causes additional detergent to be released. As is known in the art, a separate detergent receptacle is disposed within the dishwasher that is released after the spraying cycle has begun. In the exemplary embodiment described herein, the controller 24 causes the release of additional detergent by providing a signal to the actuator control circuit 18 that causes a detergent release mechanism to open. It will be appreciated, however, that additional detergent may be released using purely mechanical means. It will further be appreciated that in some embodiments, step 106 may be preceded by separate drain, fill, and spray steps to remove the dirty water generated in the original spray step 104 from the tub 54.

Regardless of whether the water is exchanged prior to releasing detergent in step 106, the controller 24 continues the spray operation in step 108 to spray the water with the newly released detergent onto the items to be cleaned. The spray operation may suitably occur continuously from step 104 through step 108. In such a case, the controller 24 need not change the state of the motor relay or the motor start control circuit 20.

After a predetermined amount of time in steps 104 through 108, or at least step 108, the controller 24 proceeds to step 110 in which water is drained from the tub 54. To this end, the controller 24 provides a signal to the relay circuit 16 that opens the relay to de-energize the motor 16a. In the exemplary embodiment described herein, the controller 24 thereafter provides signals to the relay circuit 16 and the motor start circuit 20 that cause the pump motor 16a to rotate in a reverse direction. In the exemplary embodiment described herein, the reverse rotation of the motor causes the pump to operate in pumping water out of the tub 54, as is known in the art. However, in other embodiments, a separate motor and/or pump may be used to empty the tub 54. In any event, when a low water level is detected by the controller 24 through the sensor circuit 22, then the controller 24 causes the motor 16a to be de-energized. In the embodiment described herein, the low water level may suitably be detected using the motor run winding current sensed by the current sensor.

Steps 112 through 116 represent the rinse cycle of the dishwashing operation. In step 112, the controller 24 performs a water fill operation similar to that described above in connection with step 102. Thereafter, in step 114, the controller 24 performs the spray operation, similar to that of step 104. If a so-called rinse-aid receptacle is employed, the controller 24 may in step 114 provide a signal to the relay control device 16 that causes a rinse-aid release mechanism to open. In any event, after a predetermined duration of spraying in step 114, the controller 24 proceeds to step 116 to drain the water from the tub 54. To this end, step 116 may suitably be substantially the same as step 110.

As discussed above, the operations of the flow diagram 100 may vary somewhat from dishwasher to dishwasher. Moreover, within any particular dishwasher, the operations of the flow diagram 100 may be altered through user selection of particular cycles and options. However, regardless of variation in such operations, any appliance may readily obtain the benefits of the novel switch arrangement of the present invention by incorporating the rotating switch and selection switch in an environment in which the user is allowed to provide input that affects dishwasher operation.

In addition, the benefits of the current sense circuit of the present invention may be obtained by incorporating the sense resistor of the present invention in any appliance that employs current feedback to control the operation of the motor or some other device. Moreover, the benefits of external communication of one aspect of the present invention may be obtained by incorporating the first and second optical communication devices of the present invention in any household appliance that incorporates an electronic controller capable of effecting data communication. Indeed, a dishwasher or other appliance will be enhanced by incorporation of any of the above described benefits individually or in combination.

Figure 4:
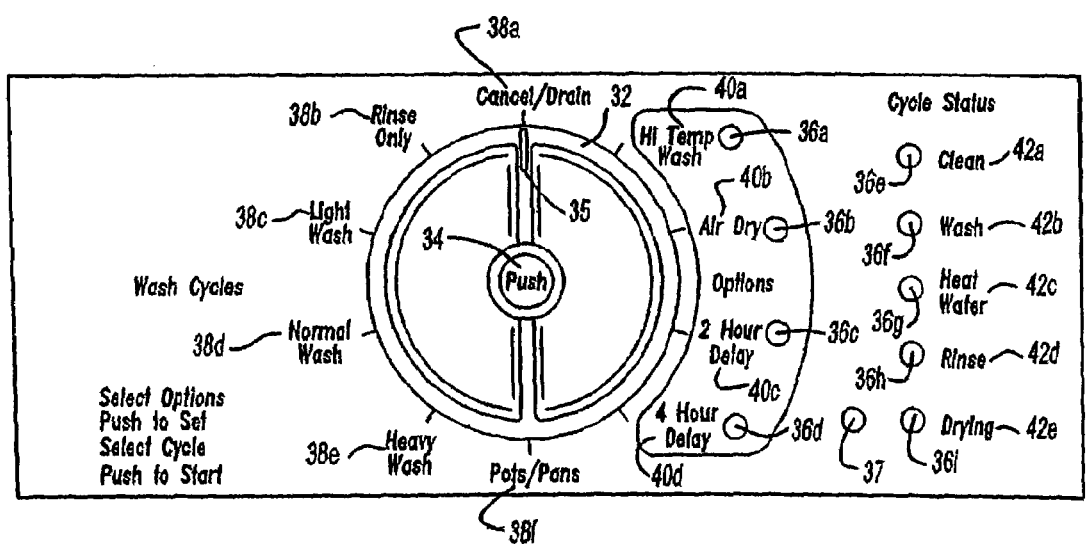
FIG. 4 shows a front view of an exemplary control panel for use in connection with the appliance circuit of FIG. 2.

FIG. 4 shows a front view of an exemplary control panel 52 for use in connection with the dishwasher control circuit 10 of FIG. 2. The control panel 52 is preferably located at a user-accessible portion of the dishwasher apparatus. The control panel 52 provides the interface through which an operator generates control input signals and through which information related to the operation of the dishwasher may be communicated to the user. To this end, the control panel 52 includes an exemplary embodiment of the rotating position switch 32, an exemplary embodiment of the selection switch 34, and a plurality of indicator lights 36a through 36i.

As discussed above, the rotating position switch 32 and the selection switch 34 constitute a portion of the switch input circuit 12 of FIG. 2. The rotating position switch 32 is rotatably mounted to the dishwasher in a manner described in further detail below in connection with FIGS. 5 and 6. The rotating position switch 32 includes a position indicator 35 that defines a reference point for the annular (i.e. rotational) position of the rotating position switch 32.

Disposed around the rotating position switch 32 at distinct annular positions are cycle selection indicia 38a through 38f and option choice indicia 40a through 40d. Each of the indicator lights 36a through 36d is disposed adjacent to corresponding option choice indicia 40a through 40d.

As shown in FIG. 4, the exemplary cycle choice indicia include "Cancel/Drain" indicia 38a, "Rinse Only" indicia 38b, "Light Wash" indicia 38c, "Medium Wash" indicia 38d, "Heavy Wash" indicia 38e and "Pots/Pan" indicia 38f. Such indicia represent the available cycle selections. The operator or user selects a cycle by rotating the rotating position switch 32 until the position indicator 35 is aligned adjacent to the indicia 38x that corresponds to the type of washing cycle desired, where x is any of a through f. In the exemplary embodiment described herein, the operator further actuates the selector switch 34 to input the cycle selection to the controller 24.

In general, the user cycle selections associated with the indicia 38a through 38f are carried out by altering or adjusting the operations of the flow diagram 100 of FIG. 3. For example, selection of the "Heavy Wash", "Medium Wash" and "Light Wash" may vary the length of step 104 and/or step 108. In another example, the selection of "Rinse Only" may omit steps 102 through 110 entirely. The selection of "Drain/Cancel" causes immediate execution of step 116. It will be appreciated that the present invention is in no way limited to any particular number or type of cycle choices that are available to the operator. Nor is the present invention limited to the cycle choices and how those choices are implemented by the controller 24. Moreover, other appliances such as clothes washers and dryers will necessarily have a different set of cycle choices.

After selecting a cycle choice as described above, the operator may subsequently select an optional operation by rotating the rotating position switch 32 until the position indicator 35 is aligned adjacent to the option choice indicia 40x that corresponds to the option desired, where x is any of a through d. As shown in FIG. 4, the exemplary option choice indicia include "Hi-Temp Wash" indicia 40a, "Air Dry" indicia 40b, "2 Hour Delay" indicia 40c, and "4 Hour Delay" indicia 40d. In the exemplary embodiment described herein, the operator further actuates the selector switch 34 to input the cycle selection to the controller 24.

In general, the user option selections associated with the indicia 40a through 40d are carried out by the controller 24 in self-evident ways. For example, selection of the "Hi-Temp Wash" option could cause the controller 24 to adjust the temperature threshold at which it causes the heating coil 16b to be de-energized in step 102 of FIG. 3. In another example, selection of "Air Dry" causes the controller 24 to energize the vent 16c and/or the heating coil 16b after completion of step 116 of FIG. 3. The vent 16c and heating coil 16b help dry items located in the tub 54 after the water is drained out in step 116. The selection of "2 Hour Delay" and "4 Hour Delay" causes the controller 24 to delay the commencement of the operations identified in the flow diagram 100 of FIG. 3 until the corresponding delay has occurred. It will be appreciated that the exact option choices provided to the operator, and how those options are implemented by the controller 24, are largely a matter of design choice. Moreover, other types of appliances will necessarily have a different set of option choices.

Each of the indicator lights 36e through 36i is disposed adjacent to corresponding cycle status indicia 42a through 42e. The cycle status indicia include "Clean" 42a, "Wash" 42b, "Heat Water" 42c, "Rinse" 42d, and "Drying" 42e. In operation, the controller 24 energizes the indicator light 36e adjacent to the "Clean" indicia 42a upon completion of step 116 of FIG. 3. The controller 24 energizes the "Wash" indicia 42b during steps 104–110 of FIG. 3. The controller 24 energizes the "Heat Water" indicia 42c during steps 102 and 112 of FIG. 3. The controller 24 energizes the "Rinse" indicia 42d during steps 114 and 116 of FIG. 3. The controller 24 energizes the "Drying" indicia 42e during the optional air dry operation, discussed above.

Figure 5:
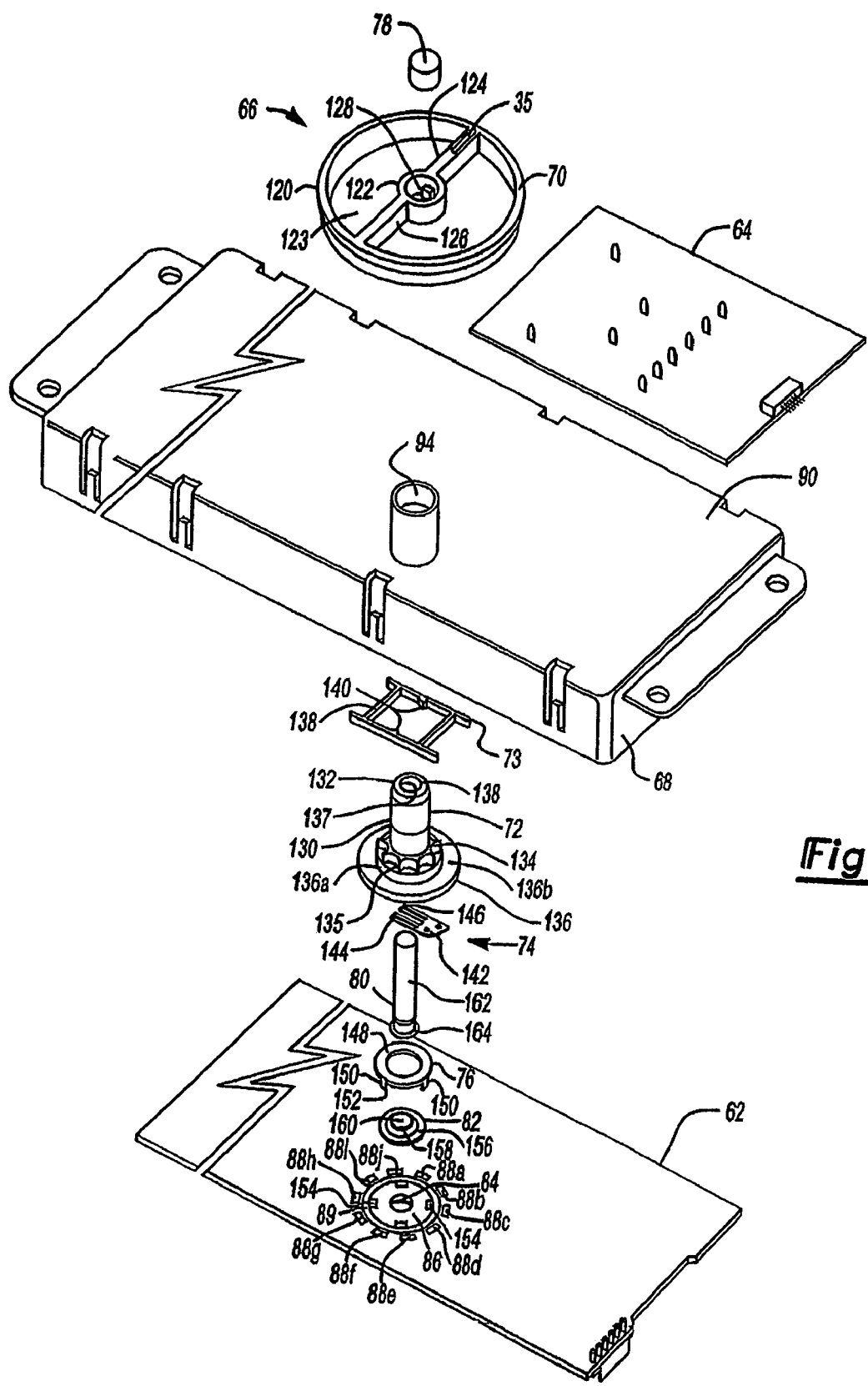
FIG. 5 shows an exploded perspective view of an exemplary control panel and circuit board that may be used in connection with the appliance circuit of FIG. 2.
Figure 6:
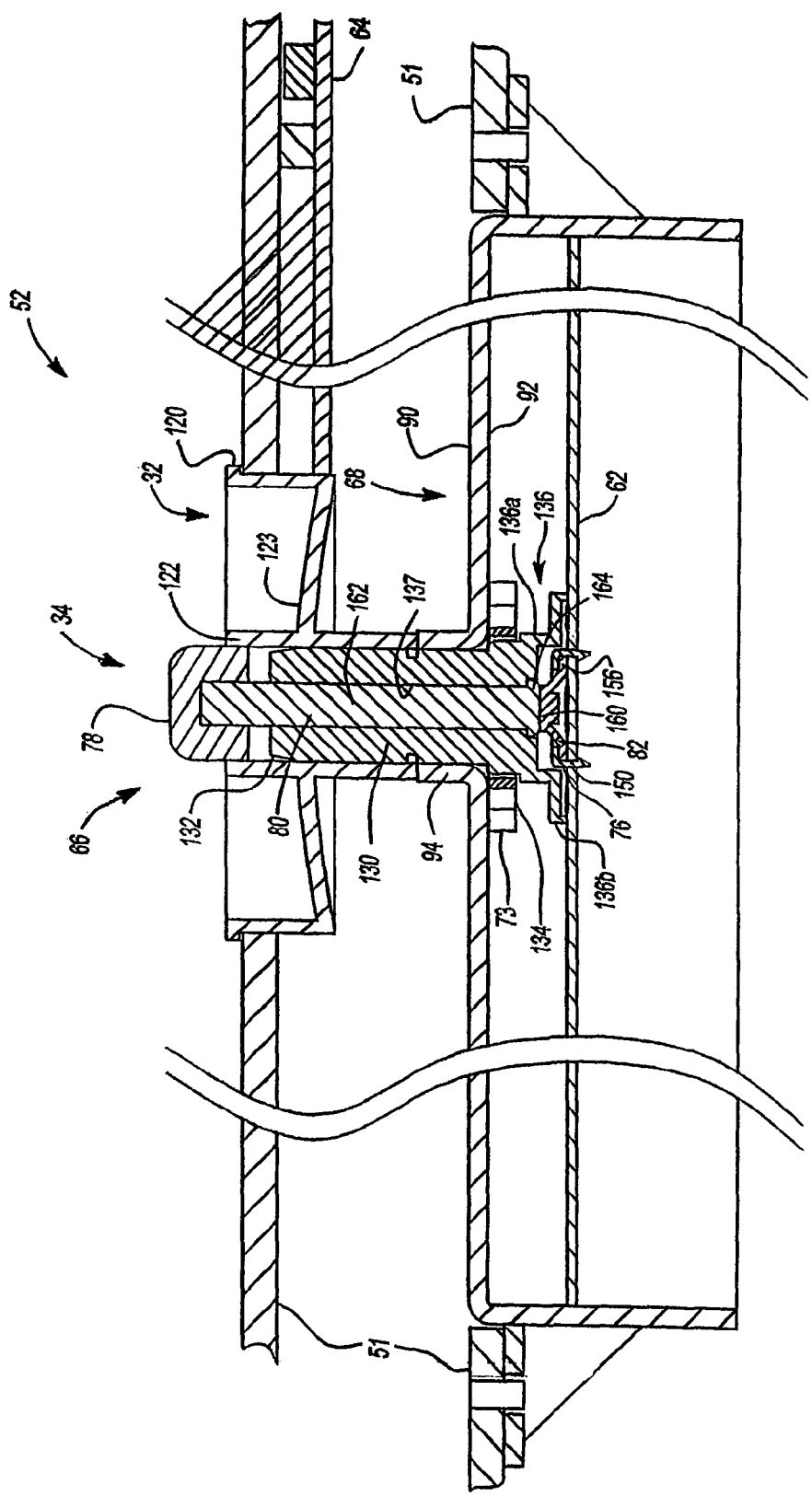
FIG. 6 shows a cross sectional view of the control panel and circuit board of FIG. 5 assembled within a portion of a dishwasher frame.

FIGS. 5 and 6 show in further detail an exemplary mechanical configuration of the control panel 52 and the control circuit 10 into a portion of the dishwasher frame 51. FIG. 5 shows an exploded view of the control panel 52 apart from the dishwasher frame 51. FIG. 6 shows a fragmentary cross-section of the dishwasher frame 51 with the control panel 52 installed therein.

Referring to FIGS. 5 and 6 contemporaneously, the control panel 52 includes a primary printed circuit board ("PCB") 62, a secondary PCB 64, a dual switch assembly 66, and housing 68. The primary PCB 62 and the secondary PCB 64 contain the control circuit 10 (see FIG. 2). The dual switch assembly 66 includes components of both the selector switch 34 and the rotating position switch 32. The rotating position switch 32 includes a rotatable handle 70, a rotating shaft 72, a tactile feedback member 73, a conductive cam 74, and a spacer 76. The selector switch 34 includes a pushbutton 78, an axial displacement shaft 80, and an elastomeric spring contact member 82. The primary PCB 62 further includes first and second selector contacts 84 and 86, respectively, annular position contacts 88a through 88j, and an annular continuous contact 89.

The rotatable handle 70 comprises a substantially circular outer ring 120 and a substantially circular inner ring 122. A disk-like bottom surface 123 extends from the bottom edge of the inner ring 122 to the bottom edge of the outer ring 120. Two radial members 124 and 126 extend axially upward from the bottom surface 123 and extend radially in opposite directions from the inner ring 122 to the outer ring 120. The position indicator 35 (see also FIG. 4) is disposed on the radial member 124. Within the inner ring 122 is a detent 128 that chords off a portion of the inner ring 122. The rotatable handle 70 is disposed above a first side 90 of the housing 68.

The rotating shaft 72 includes an elongate shaft 130, a top ring 132, a tooth ring 134, a base 136, and a hollow interior 137. The hollow interior 137 extends axially along the entire length of the rotating shaft 72. The top ring 132 has diameter configured to fit within the inner ring 122 of the rotatable handle 70. To this end, the top ring 132 includes a chorded outer surface region 138 configured to allow the top ring 132 to fit within the portion of the inner ring 122 that includes the detent 128. The top ring 132 is also, except for the chorded region 138, preferably slightly frustoconical in shape, tapering slightly inward from bottom to top. (See FIG. 6).

The elongate shaft 130 extends axially downward from the top ring 132 and has a diameter that is less than the inner diameter of the inner ring 122. The tooth ring 134 is disposed axially below the elongate shaft and has a radius generally exceeding that of the elongate shaft 130 and the inner ring 122. The tooth ring 134 includes a plurality of teeth 135 formed by slight radial concavities disposed at annular positions corresponding to the rotational contacts 88a through 88i. In particular, each pair of adjacent teeth 135 is separated by a concavity.

The base 136 includes a first hollow ring 136a and a second hollow ring 136b. The first hollow ring 136a is disposed directly below the tooth ring 134 and has an outer radius slightly exceeding the radius of the tooth ring 134. The second hollow ring 136b is disposed directly below the first hollow ring 136a and has an outer radius exceeding that of the first hollow ring 136a.

In general, the elongate shaft 130 extends through an opening 94 in the housing 68 such that the top ring 132 (and rotatable handle 70) is (are) located above the first surface 90 of the housing 68 and the tooth ring 134 and base 136 are located below a second surface 92 of the housing 68.

The tactile feedback member 73 includes an open rectangular frame 138 having length and width dimensions generally exceeding the radius of the tooth ring 134 but generally less than the second hollow ring 136b of the base 136. Disposed on two inner edges of the frame 138 are detents 140. The detents 140 have dimensions configured such that each may be received by any of the concavities between the teeth 135 of the tooth ring 134. The frame 138 is generally disposed around the tooth ring 134, trapped in an axial position between the second surface 92 of the housing 68 and the base 136. The frame 138 is preferably at least in part elastically deformable such that manual rotational force applied to the rotating shaft 72 causes the teeth 135 to overcome and traverse the detents 140.

The conductive cam 74 includes an anchor 142, a first cam contact 144 and a second cam contact 146. The anchor 142 is secured to the base 136 of the rotating shaft 72, and more particularly, within the second hollow ring 136b of the base 136. The first cam contact 144 extends in a tangential direction (with respect to the rotating elements of rotating shaft 72) from the anchor 142, and is also slightly inclined to extend axially downward from the base 142. The first cam contact 144 is disposed at a radial position aligned with the radial position of the rotational position contacts 88a through 88j of the primary PCB 62. The second cam contact 146 is disposed radially spaced apart from the first cam contact 144 but otherwise extends from the anchor 142 in a similar manner. The second cam contact 144 is disposed at a radial position aligned with the radial position of the continuous contact 89 of the primary PCB 62.

The spacer 76 includes an arched ring structure 148 that arches axially downward moving radially outward from the inner edge of the ring structure 148. Thus, the ring structure 148 extends from a substantially flat, radially extending surface near its inner edge, to a substantially vertical, axially extending surface near its outer edge. The spacer 76 further includes a plurality of axially extending legs 150, each having a respective retention barb 152 disposed thereon. The plurality of legs 150 are received by corresponding holes 154 in the primary PCB 62 and are retained within the holes 154 by engagement of the retention barbs 152 against the opposite surface of the PCB 62. The ring structure 148 has an outer diameter that is configured to fit within the first hollow ring 136a as shown in FIG. 6.

The pushbutton 78 is in the general shape of a cap that is slidably received into the inner ring 122 of the rotatable handle 70. The pushbutton is 78 secured to the axial displacement shaft 80. The pushbutton 78 has an outer radius that exceeds an inner radius of the top ring 132 of the rotating shaft 72, thereby defining the axial limit of downward travel of the pushbutton 78.

The elastomeric spring contact member 82 includes a base ring 156, a frustoconical spring portion 158, and a contact/button member 160. The base ring 156 has a radius configured to fit within and be trapped by the arched ring structure 148, as shown in FIG. 6. The frustoconical spring portion 158 extends radially inward and axially upward from the base ring 156 and terminates in the contact/button member 160. The contact button member 160 extends axially outward from, but is disposed radially within, the arched ring structure 148. The contact/button member 160 includes a conductive contact such as carbon or the like, not shown, on its underside, which is configured to contact the first and second conductive contacts 84 and 86 when the spring contact member 82 is in a compressed or actuated state. In an alternative embodiment, the spring contact member may be formed of a conductive metal or another type of nonconductive material that includes conductive contacts.

The axial displacement shaft 80 includes an elongate member 162 and a bottom flange 164. The axial displacement shaft 80 extends in an elongate manner from the pushbutton 78 to the contact button member 160. To this end, the elongate member 162 is slidably disposed within the hollow interior 137 of the rotating shaft 72. The bottom flange 164 has a radius exceeding that of the hollow interior 137, thereby limiting the axially upward movement of the axial displacement shaft 80.

The dual switch assembly 66 effectively permits two basic operations, rotational movement of the rotating position switch 32 to allow the user to align the position indicator 35 with a select cycle choice or option choice (See FIG. 4), and actuation of the selector switch 34 to "enter" the selected cycle or option choice into the controller 24 of the control circuit 10.

An operator performs rotational movement by grasping the rotatable handle 70 and applying rotational force. The rotational force of the handle 70 translates to the rotating shaft 72 through the engagement of the detent 128 of the rotatable handle 70 with the chorded region 138 of the rotating shaft 72. The rotational movement of the rotating shaft 72 causes the teeth 135 to traverse the detents 140 of the tactile feedback member 73. In particular, the rotational force causes the teeth 135 adjacent to the detents 140 to push against the detents 140. The force against the detents 140 is relieved through outward flexing of the rectangular frame 138. As each of the teeth 135 passes the detents 140, the elastic nature of the rectangular frame 138 causes the rectangular frame to "snap" back, such that the detents 140 are received into the next concavity (between the teeth 135) of the tooth ring 134. This flexing and snapping as the teeth 135 rotate past the detents 140 provide tactile and preferably audible feedback to the user, and further assist the user in aligning the rotating position switch 32 into discrete annular positions that correspond to the contacts 88a through 88j. It is noted that rotational movement of the rotating shaft 72 also rotates the cam contact 74.

When the user aligns the position indicator 35 with the indicia associated with the desired cycle or option choice (See FIG. 4), then the user stops applying rotational force. When the rotational force is removed, the tactile feedback member 73 further perfects the alignment of the rotating position switch 32 through the operation of the elastic properties described above. In the final annular position, the first cam contact 144 is in direct electrical contact with the contact 88x, wherein x is one of a through j, that corresponds to the user's selection. In all positions, the second cam contact 146 is in direct electrical contact with the continuous contact 89. Because the first cam contact 144, the second cam contact 146, and the anchor 142 form a continuous conductor, the conductive cam 74 electrically connects the contact 88x to the continuous conductor 89. As will be discussed below, such connection creates a unique signal that is recognized by the controller 24 as corresponding to the user's selection.

Thus, rotation of the rotating position switch 32 to one of its annular positions effectively creates a unique signal recognized by the controller 24 that is indicative of a user selection. The controller 24 may then perform operations corresponding to the user selection based on the recognition of the unique signal associated with the contact 88x.

However, in accordance with one aspect of the present invention, the unique signal that conveys the user cycle selection information to the controller 24 is not recognized or acted upon until the selector switch 34 is actuated. Thus, merely aligning the rotating position switch 32 with a desired cycle or option selection will not necessarily cause the controller 24 to carry out the desired operations. The selection must be "entered" by actuating the selector switch 34.

To actuate the selector switch 34 in the embodiment described herein, the user depresses the pushbutton 78, thereby causing axial movement thereof. Axial movement of the pushbutton 78 causes like axial movement of the axial displacement shaft 80. The axial movement of the axial displacement shaft 80 in turn applies axial force to the contact/button 160. The axial force of the contact/button 160 causes the frustoconical spring portion 158 to elastically compress, thereby allowing downward axial movement of the contact/button 160 to the first and second conductive contacts 84 and 86. The conductor on the underside of the contact/button 160 electrically connects the contacts 84 and 86. When the contacts 84 and 86 are connected, a signal is provided to the controller 24 that causes the controller 24 to receive, recognize, or process the unique signal created by the electrical connection between the select contact 88x with the continuous contact 89 by the rotating position switch. The controller 24 thereafter performs operations based on the user selection as described above in connection with FIGS. 3 and 4.

Figure 7:
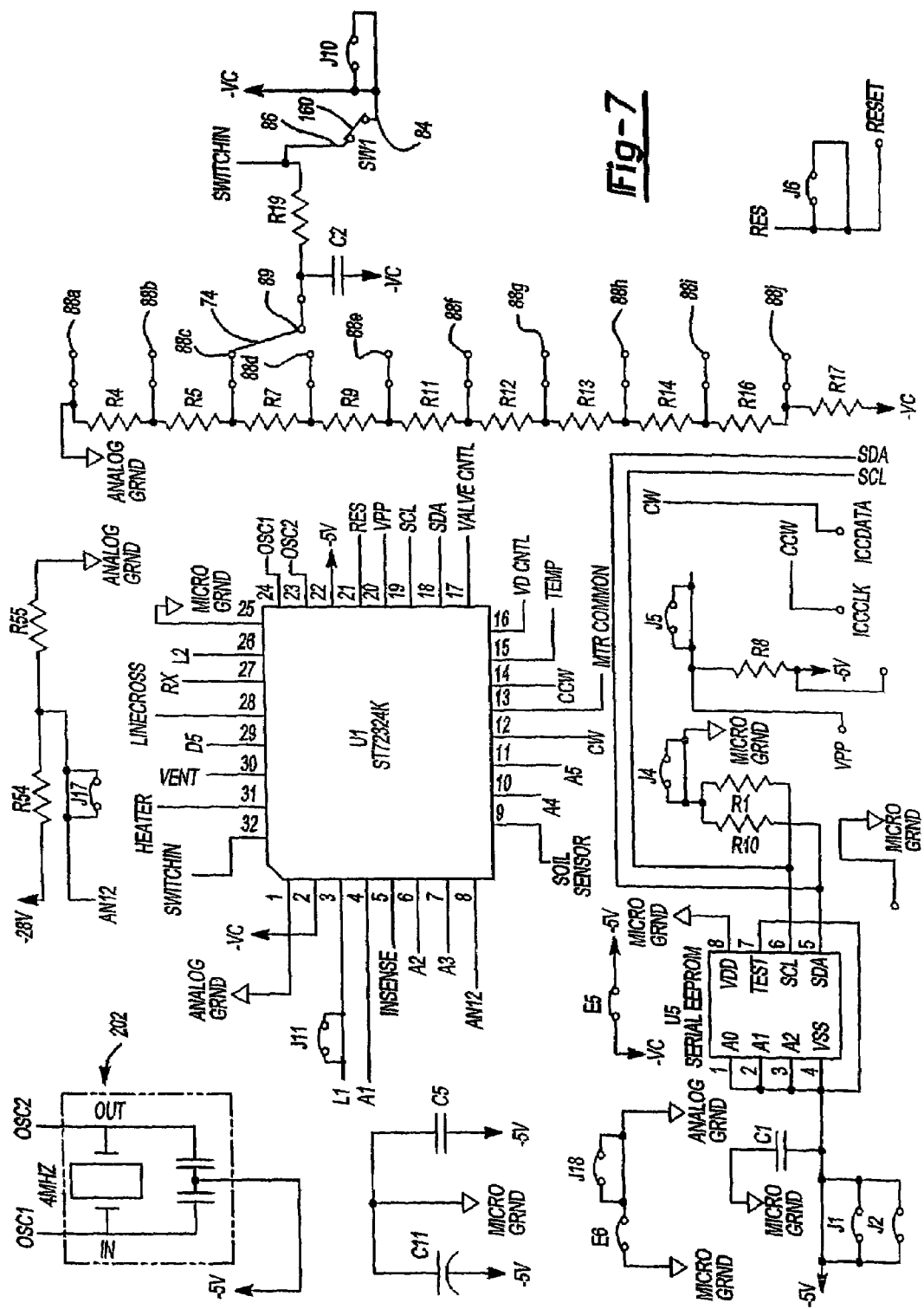
FIGS. 7 and 8 show a schematic diagram of an exemplary control circuit which may be employed as the control circuit of the appliance circuit of FIG. 2.
Figure 8:
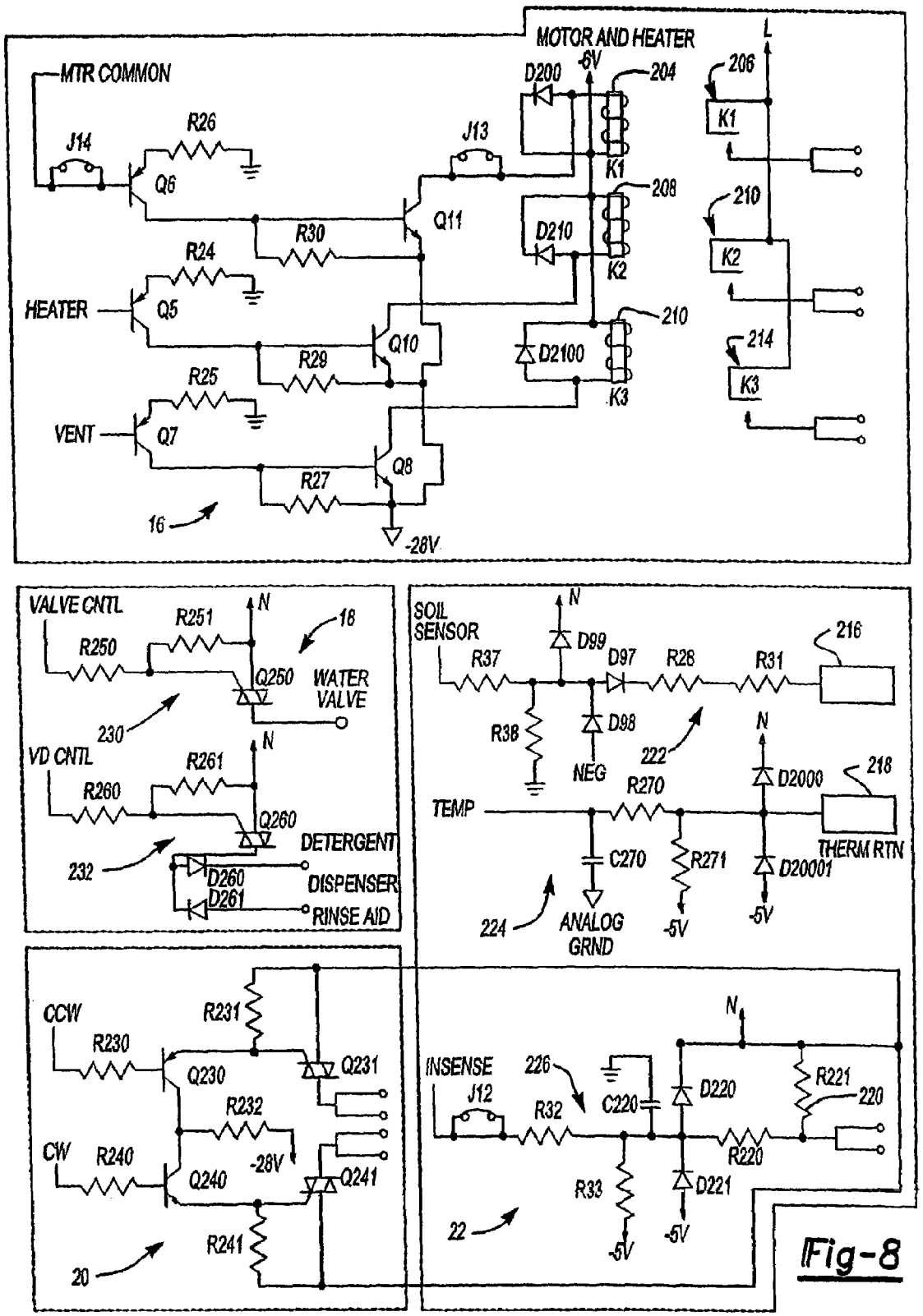

FIGS. 7, 8 and 9 show collectively a schematic diagram of an exemplary embodiment of the control circuit 10 of FIG. 2. FIG. 7 shows a portion of a schematic diagram of an exemplary embodiment of the control circuit 10 of FIG. 2 that includes the controller 24 and elements of the dual switch assembly 66 of FIGS. 5 and 6. FIG. 8 shows a portion of the control circuit 10 that includes the relay control circuit 16, the actuator control circuit 18 and the sensor circuit 22. FIG. 9 shows the optical I/O circuit 14.

Referring to FIG. 7, the controller 24 in the exemplary embodiment of FIG. 7 includes a microcontroller U1 that is operable to receive scaled analog inputs as well as receive and generate digital signals. Such devices are known in the art. In the exemplary embodiment described herein, the microcontroller U1 is the commercially available SG Thomson ST72324K. Supporting circuitry for the microcontroller U1 include a crystal oscillator circuit 202. It will be appreciated that the controller 24 could alternatively take other forms, such as a microprocessor having one or more analog-to-digital converters connected thereto for the receipt of analog signals. An EEPROM U5 is serially connected to the microcontroller U1 and is configured to store calibration information, diagnostic data, and other data as necessary.

The switch input circuit 12 in the embodiment of FIG. 7 includes a plurality of series connected resistors R4, R5, R7, R9, R11, R12, R13, R14, R16 and R17, the contacts 88a through 88j, the conductive cam 74, the continuous contact 89, a filter capacitor C2, a filter resistor R19, contacts 84 and 86, and button/contact 160.

The resistors R4, R5, R7, R9, R11, R12, R13, R14, R16 and R17 are series connected between ground and a bias voltage −VC. The contact 88a is electrically connected between the resistor R4 and ground. Each of the remaining contacts 88b through 88j are connected between adjacent pairs of the resistors R4, R5, R7, R9, R11, R12, R13, R14, R16 and R17. The continuous contact 89 is electrically connected through the filter formed by the capacitor C2 and resistor R19 to the contact 86. The contact 84 is coupled to ground.

From the above description, those of ordinary skill in the art will recognize that the resistors R4, R5, R7, R9, R11, R12, R13, R14, R16 and R17 form a ten stage voltage divider or voltage ladder. As a result, each of the contacts 88a through 88j carries a unique voltage level defined by its position on the voltage ladder. In the exemplary embodiment described herein, the resistors R4, R5, R7, R9, R11, R12, R13, R14, R16 and R17 all have the same resistance value. As a result, the voltage drop across each of the resistors R4, R5, R7, R9, R11, R12, R13, R14, R16 and R17 is the same. For example, if the voltage −VC is equal to −10 volts, then the voltage drop across each of the resistors R4, R5, R7, R9, R11, R12, R13, R14, R16 and R17 would be 1 volt. In such an example the resulting voltage levels at each of the contacts 88a through 88j would be as set forth below in Table 1:

TABLE 1

| Contact | Voltage |
| --- | --- |
| 88a | 0 V |
| 88b | −1 V |
| 88c | −2 V |
| 88d | −3 V |
| 88e | −4 V |
| 88f | −5 V |
| 88g | −6 V |
| 88h | −7 V |
| 88i | −8 V |
| 88j | −9 V |

As discussed above in connection with FIGS. 5 and 6, the conductive cam 74 is operable to selectively couple the continuous contact 89 with any of the contacts 88a through 88j. In FIG. 7, the conductive cam 74 is shown in an exemplary position connecting the continuous contact 89 with the contact 88c. As a result, the voltage on the continuous contact 89 is equal to the voltage at the contact 88c. This voltage propagates to the microcontroller U1 through the SWITCHIN input, which is coupled between the resistor R19 and the contact 86.

As discussed above, the microcontroller U1 does not automatically act upon the voltage from the continuous contact 89. Instead, the microcontroller U1 must receive a trigger signal via the selector switch 34 before responding to the voltage level on the continuous contact 89. To this end, when the button/contact 160 is actuated and thus contacts 84 and 86 are electrically connected, then the microcontroller input SWITCHIN is shorted to −VC. The microcontroller U1 is configured to recognize the −VC voltage as a trigger to receive input based on the position of the conductive cam 74.

In particular, in accordance with the example illustrated in FIG. 7, when the button/contact 160 is in its normally open position (un-actuated), the voltage at SWITCHIN is equal to the voltage at the contact 88c. The microcontroller U1 does not, however, perform actions responsive to the voltage at SWITCHIN. Thus, movement of the rotating position switch 32 and the resulting movement of the conductive cam 74 to another contact 88x will change the voltage at SWITCHIN but will not alter operations of the microcontroller U1.

However, if the microcontroller U1 detects −VC at SWITCHIN, then it will wait until the −VC voltage is removed from SWITCHIN, read the steady state voltage at SWITCHIN, and then perform a set of operations based on the steady state voltage. Thus, when the selector switch 34 is actuated, the microcontroller U1 detects −VC at SWITCHIN and then waits for the subsequent voltage. As the selector switch 34 is released, −VC is no longer connected to SWITCHIN. Instead, the voltage from the contact 88x at which the conductive cam 74 is positioned returns to SWITCHIN. The voltage from the contact 88x thus constitutes the subsequent voltage detected by the microcontroller U1. The microcontroller U1 then performs operations associated with the user cycle or option selection that corresponds with the position of the contact 88x.

In summary, as discussed above in connection with FIGS. 5 and 6, the user selection is communicated via the annular position of the rotating position switch 32 through the annular positioning of the contacts 88a through 88j. The contacts 88a through 88j each provide a unique voltage level to the microcontroller U1 because they are connected to discrete positions of a multi-stage voltage ladder circuit. Thus, the voltage level detected by the microcontroller U1 corresponds uniquely to an annular position selected by the user.

In addition, the microcontroller U1 only reads the ladder voltage upon receipt of a unique activation signal, the voltage level −VC, which results from the actuation of the selector switch 34.

It will be appreciated that other electrical circuits may readily be employed to convey position information to the microcontroller U1. For example, the discrete contacts 88a through 88j may be replaced with a single rheostat that also forms a voltage divider that provides a voltage level to the microcontroller based on annular position. In still another embodiment, each position contact 88a through 88j may simply be connected to a different input of the microcontroller U1, or to a multiplexor that provides a four digit binary code to the microcontroller U1. While these and other alternatives are viable and still obtain many of the benefits of the present invention, the embodiment disclosed herein provides additional advantages because it requires minimal inputs to the microcontroller U1 and it can achieve more reliable input value separation than typical rheostats. One alternative that only requires one additional microcontroller input is an alternative in which the contacts 84 and 86 provide a signal to a separate microcontroller input, as opposed to the same input to which the ladder voltage is provided.

FIG. 8 shows an exemplary schematic of the portion of the control circuit 10 that includes the relay control circuit 16, the actuator control circuit 18, the motor start circuit 20, and the sensor circuit 22. The relay control circuit 16 includes a motor relay K1, a heater relay K2, and a vent relay K3. The motor relay K1 includes a coil 204 and a set of contacts 206, the heater relay K2 includes a coil 208 and a set of contacts 210, and the vent relay K3 includes a coil 212 and a set of contacts 214. The motor relay contacts 206 are operably coupled to selectively and controllably complete the circuit through the run winding 19a of the motor. (See FIG. 2). The heater relay contacts 210 are operably coupled to selectively and controllably complete the circuit through the heater coil 16b. (See FIG. 2). The vent relay contacts 214 are operably coupled to selectively and controllably complete the circuit through the vent 16c. (See FIG. 2).

The motor relay coil 204 is operably coupled to a MTR COMMON output of the microcontroller U1 (see also FIG. 7) through a pair of driver transistors Q6 and Q11. The heater relay coil 208 is operably coupled to a HEATER output of the microcontroller U1 (see also FIG. 7) through a pair of driver transistors Q5 and Q10. The vent relay coil 212 is operably coupled to a VENT output of the microcontroller U1 (see also FIG. 7) through a pair of driver transistors Q7 and Q8.

Accordingly, when during the operations of the dishwasher (see FIGS. 3 and 4) the microcontroller U1 is required to turn on the motor 16a, the microcontroller U1 provides an activation signal to its MTR COMMON output. The activation signal is amplified through the driver resistors Q6 and Q11. The amplified activation signal energizes the motor relay coil 204, thereby causing the motor relay contacts 206 to close. Closure of the motor relay contacts 206 allows motor drive current to flow through the run winding 19a of the motor 16a. However, when the motor 16a first begins to run, one of the start windings 19b or 19c may also be energized as will be discussed further below in connection with the motor start circuit 20.

Similarly, when during the operations of the dishwasher (see FIGS. 2 and 3) the microcontroller U1 is required to energize the heater coil 16b, the microcontroller U1 provides an activation signal to its HEATER output. The activation signal is amplified through the driver resistors Q5 and Q10. The amplified activation signal energizes the heater relay coil 208, thereby causing the heater relay contacts 210 to close. Closure of the heater relay contacts 210 allows current to flow through the heater coil 16b, thereby generating heat.

Likewise, when during the operations of the dishwasher (see FIGS. 2 and 3) the microcontroller U1 is required to energize the vent 16c, the microcontroller U1 provides an activation signal to its VENT output. In the exemplary embodiment described herein, the vent 16c may be used during execution of the optional "Air Dry" operation after step 116 of FIG. 3. In any event, the vent activation signal is amplified through the driver resistors Q7 and Q8. The amplified activation signal energizes the vent relay coil 212, thereby causing the vent relay contacts 214 to close. Closure of the vent relay contacts 214 closes the power circuit through the vent 16c, thereby activating the vent 16c.

The sensor circuit 22 includes a soil sensor 216, a temperature sensor 218, and a current sensor 220. The soil sensor 216 is coupled to the SOIL SENSOR input of the microcontroller U1 through a conditioning circuit 222. The temperature sensor 218 is coupled the TEMP input of the microcontroller U1 through a conditioning circuit 224. The current sensor 220 is coupled to the ISENSE input of the microcontroller U1 through a conditioning circuit 226.

In general, the soil sensor 216 and the corresponding conditioning circuit 222 cooperate to generate a signal that has a quality representative of a soil level which is recognizable to the microcontroller U1. The microcontroller U1 may employ the soil sensor signals from the soil sensor 216 to alter the duration of the spray steps (e.g., steps 104–108 of FIG. 3), or to cause a repetition of one or more steps of the wash cycle.

The temperature sensor 218 and the corresponding conditioning circuit 224 cooperate to generate a signal that has a quality representative of the water temperature which is recognizable to the microcontroller U1. The microcontroller U1 controls the operation of the heater relay K2 based on the water temperature signal.

The current sensor 220 and the corresponding conditioning circuit 226 cooperate to generate a signal that has a quality representative of a current level in the run winding 19a of the motor 16a. In accordance with one aspect of the present invention, the microcontroller U1 uses the current level in the run winding 19a of the motor 16a to determine whether or not to energize or de-energize one or more start windings 19b and/or 19c in the motor. As is known in the art, it is advantageous to energize an additional start winding in a motor when starting the motor. After the motor achieves its steady state speed, the additional start winding need no longer be energized.

To this end, the microcontroller U1 processes the current sense signals received at its ISENSE input and controllably energizes or de-energizes one of two start windings of the motor 16a. Referring to the motor start circuit 20 and FIG. 7, the microcontroller U1 includes a CCW output and a CW output that are coupled to the motor start circuit 20. The CCW output is coupled through a driver transistor Q230 to the control input of a triac switch Q231. The triac switch Q231 is operably coupled to controllably connect and disconnect the circuit through the counterclockwise winding 19c of the motor 16a. (See FIG. 2). To this end, one side of the triac switch Q231 is coupled to the motor neutral line, and the other is configured to be coupled to the counterclockwise winding 19c. (See FIG. 2). In an analogous manner, the CW output is coupled through a driver transistor Q240 to a triac switch Q241. One side of the triac switch Q241 is coupled to the motor neutral line and the other side is configured to be coupled to the clockwise winding 19b of the motor 16a. (See FIG. 2).

Referring again generally to the sensor circuit 22, the current sensor 220 in the exemplary embodiment described herein is a relatively low resistance shunt resistor. In the embodiment of FIG. 7, the shunt resistor 220 has a resistance value of about 0.045 ohms. In accordance with one aspect of the present invention, the shunt resistor 220 is formed as an etched path on the primary PCB 62.

Figure 10:
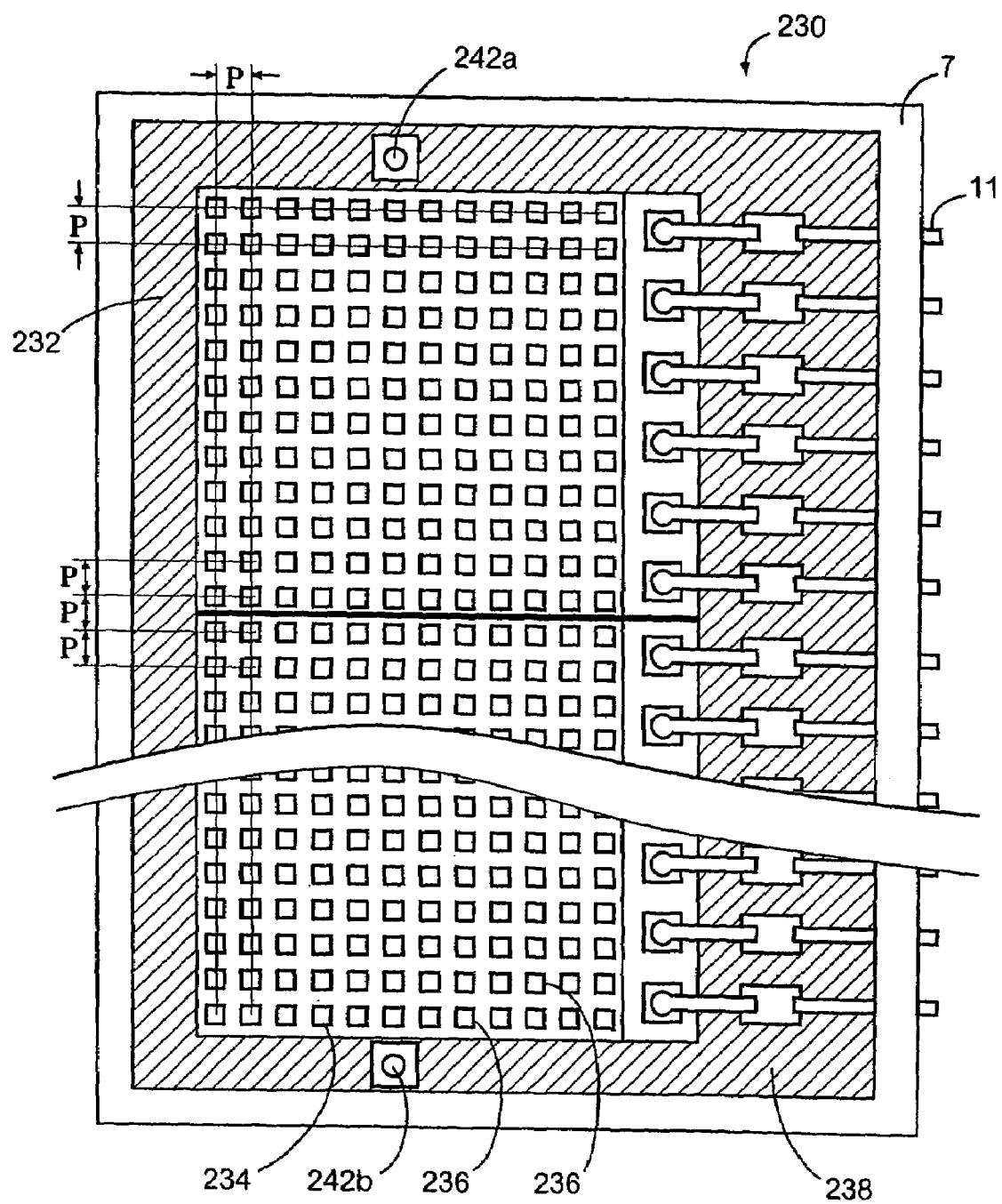
FIG. 10 shows a diagram of an exemplary vacuum fluorescent display (VFD) that may be used as a display in the dishwasher of FIG. 1.

In particular, FIG. 10 shows an exemplary trace layout of the PCB 62. FIG. 10 shows the primary PCB 62 in its unpopulated state. When populated, the various elements illustrated in FIGS. 7 and 8 of the control circuit 10 are mounted on the primary PCB 62. The traces on the primary PCB 62 connect the various elements mounted on the PCB 62.

As indicated above, however, the current sensor 220 is not a separate device that is mounted on the primary PCB 62, but instead is formed by one of the traces. For example, in FIG. 10, the current sensor 220 is a trace 221 having a geometry, primarily its length and width, configured to create a resistance of about 0.045 ohms. The width must be sufficient to carry the current of the run winding 19a of the motor 16a. In the embodiment described herein, the trace of the current sensor 220 includes a plurality of switch backs 221a in order to obtain the desired length within a confined area of the circuit board surface. However, it will be appreciated that other trace geometries may be used and still obtain many of the benefits of the present invention. FIG. 10 further shows traces that constitute the switch contacts 88a through 88j as well as contact 89.

The incorporation of the current sensor 220 as a trace on the PCB 62 helps reduce overall cost. Prior art current sensing resistors having a resistance of less than one ohm often have consisted of coiled wires that were costly to both manufacture and assemble onto the circuit board. The use of the trace as the current sensor 220 incurs relatively little cost, and conductive traces are well-suited for small resistance values.

Referring again to FIG. 8, the current sensor 220 is adapted to be coupled to a measurement point 228, which in turn is adapted to be coupled to the run winding of the motor. The current sensor 220 is coupled on the other side to motor neutral. As a result, the current sensor 220 represents a very low resistive path from the run winding to ground, thereby forming the shunt. The ISENSE input of the microcontroller U1 is then coupled to the measurement point 228 through series resistors R32 (10 k-ohms) and R220 (10 k-ohms). A biasing resistor R33 (59 k-ohms) and a protection diode D221 are coupled between the junction of the two resistors R32 and R220 and a bias voltage. A capacitor C220 (0.01 microfarads) is coupled between the junction of the two resistors R32 and R220 and ground.

In general, the current flowing through the run winding 19a of the motor 16a is shunted to ground almost entirely through the current sensor 220 because any other path runs through the much more resistive resistor R220. However, it is noted that an alternative path through a diode D220 is provided should the current sensor 220 become open circuited. Nevertheless, under normal circumstances, the voltage measured at the reference point 228 divided by the resistance of the current sensor 220 provides an approximation of the run winding current. The voltage signal at the reference point 228 is provided to the ISENSE input through the conditioning circuit 226 formed by the resistors R32, R220, R33, diodes D221, D220 and the capacitor C220. Thus, the voltage signal at the ISENSE input is representative of the current flowing in the run winding 19a of the motor 16a. Configured as described above, the signal at the ISENSE input has a waveform that tracks the waveform of the run winding current waveform.

The microcontroller U1 may then use that ISENSE signal waveform to control various aspects of the dishwasher. As discussed below, the microcontroller U1 determines whether and when to energize and de-energize the start winding 19b or 19c of the motor 16a based on the magnitude of the run winding current. In general, when the motor 16a starts, the run winding current tends to be relatively high. As a result, the ISENSE signal will likewise have a relatively high magnitude. The microcontroller U1 is programmed to cause the start winding 19b or 19c to be energized when the ISENSE signal has a relatively high magnitude. After the motor 16a reaches its running speed, the current through the run winding 19a drops. Accordingly, the microcontroller U1 causes the start winding 19b or 19c to be de-energized when the magnitude of the ISENSE signal falls below a certain threshold.

In addition, the microcontroller U1 may determine whether to open the water valve to adjust the water level in the tub 54 based at least in part on the phase of the run winding current, which may also be detected from the ISENSE signal waveform.

Referring specifically to the control of the start windings, an exemplary operation in which the microcontroller U1 starts the motor, for example, to begin the spray operation of step 104 of FIG. 3. To start the motor, the microcontroller U1 provides a signal to its MTR COMMON output and its CW output. The signal at the CW output operates to turn on the triac Q241, thereby connecting the clockwise start winding 19c to motor neutral. The signal at the MTR COMMON output causes the relay contacts 206 to connect the windings 19a and 19c of the motor 16a to a common power connection. As a result, the run winding 19a and the clockwise start winding 19c of the motor 16a are energized and the motor 16a begins to rotate in the clockwise direction. As the motor 16a begins to approach its steady state speed, the magnitude of the current in the run winding 19a (and clockwise start winding 19c) will begin to decrease. Thus, the magnitude of the signal at the ISENSE input of the microcontroller U1 also decreases. When the magnitude of the signal at the ISENSE input falls below a predetermined level, the microcontroller U1 removes the signal from the CW output. As a result, the triac Q241 is turned off and the clockwise start winding 19c is open-circuited. The predetermined level of ISENSE is a level that corresponds to a run winding current consistent with the motor running at or near steady state. At steady state, the motor no longer requires the start winding to be energized. Those of ordinary skill in the art may readily determine the appropriate run winding current level at which to turn off the start winding current.

The motor 16a continues to run at steady state with current only in the run winding 19a. When the microcontroller U1 stops the motor 16a, as in the completion of step 108, then the microcontroller U1 removes the signal from its MTR COMMON output. Removal of the signal from the MTR COMMON output causes the motor relay coil 204 to open the motor relay contacts 206, thereby de-energizing the run winding 19b.

The microcontroller U1 may also cause counterclockwise operation of the motor 16a, which may be used to during the water drainage steps 110 and 116 of FIG. 3, by performing the same operations as described above using its CCW output instead of the CW output.

It will be appreciated that the current sensor 220 preferably has a high degree of accuracy (i.e. tight tolerance on resistance value). In some cases, the degree of accuracy cannot be easily achieved in a low resistance resistor formed as a trace on a circuit board such as that shown by example in FIG. 10. Even relatively small error in the resistance value of the current sensor (e.g. 0.049 ohms instead of 0.045 ohms) can lead to unpredictability in the control operations of the microcontroller U1. For example, consider a situation in which the microcontroller U1 ideally causes current to be removed from a start winding when the run winding current is N amps, and the nominal (ideal) resistance of the current sensor 220 is 0.045 volts. In such a situation the microcontroller U1 is programmed to cause the start winding current to be removed when the voltage drop over the current sensor 220 is N/0.045. As a result, the microcontroller U1 will cause current to be removed from the start winding when the voltage at the measurement point 228 is detected to be N/0.045 volts with respect to motor neutral. If, however, the actual resistance of the current sensor 220 is 0.049 ohms, then the run winding current will be N when the voltage at the measurement point 228 is N/0.049 volts, not N/0.045. Nevertheless, the microcontroller U1 would cause the current to be removed from the start winding when the voltage at the measurement point 228 is N/0.045 volts. When the voltage at the measurement point 228 is N/0.045 volts, the actual current magnitude is higher than N due to the error in the current sensor. Thus, the microcontroller U1 would turn off the start winding current before the desired time.

To avoid such unpredictability in operation, the microcontroller U1 may be configured to compensate for error (variation of the resistance) of the current sensor 220. To compensate for resistance error, the microcontroller U1 digitally scales the magnitude of the signal at ISENSE by the amount of the resistance error. Thus, if the actual resistance of the current sensor 220 is 0.049 ohms, then the microcontroller U1 would scale the ISENSE signal by 0.045/0.049. Thus, instead of removing the current at N/0.045, current is removed at (0.045/0.049)*N/0.045, or N/0.049. As discussed above, if the actual resistance of the current sensor 220 is 0.049 ohms, then the current is N when the voltage magnitude at the measurement point 228 is N/0.049.

The percentage of resistance error may be determined any time after the etched current sensor 220 is formed, even before the primary PCB 62 is populated. The compensation factor derived from the determined error may then be stored in the EEPROM U5 (see FIG. 7) or other non-volatile memory (see generally the memory 26 of FIG. 2). By providing a programmable memory in which to store the compensation factor, the variable nature of the error arising from the use of an etched resistor is accommodated. In particular, because the resistance value is relatively low (i.e. less than one-tenth of an ohm), even small variations in the trace thickness, geometry or width can significantly alter the resistance value. Thus, the resistance error can vary as a function of manufacturing tolerances, thereby requiring custom compensation in each device. The use of a programmable memory device for storing the compensation factor allows for custom calibration of each device.

Nevertheless, if manufacturing tolerances are tightened sufficiently to eliminate the need for compensation, then the requirement of using a compensation factor can be eliminated altogether.

The actuator circuit 18 includes a valve actuator circuit 230 and a detergent/rinse aid actuator circuit 232. The valve actuator circuit 230 includes a semiconductor switch Q250 that gates the water valve solenoid, not shown, to AC neutral. A VALVE CNTL output of the microcontroller U1 is connected to the control input of the switch Q250. The detergent/rinse aid actuator circuit 232 is similarly controlled through a triac Q260. In the exemplary embodiment disclosed herein, the detergent dispenser release mechanism is coupled through a first diode D260 and the rinse-aid dispenser is coupled through a second diode D261. The second diode D261 is reverse biased with respect to the first diode D260. So configured, if the microcontroller U1 only energizes the triac Q260 during positive half cycles of the line voltage, then only the rinse aid dispenser is actuated. Similarly, if the microcontroller U1 only energizes the triac Q260 during negative half cycles of the line voltage, then only the detergent dispenser is actuated. In this manner, two separate devices may be independently controlled using a single microcontroller output and a single semiconductor switch.

Figure 9A:
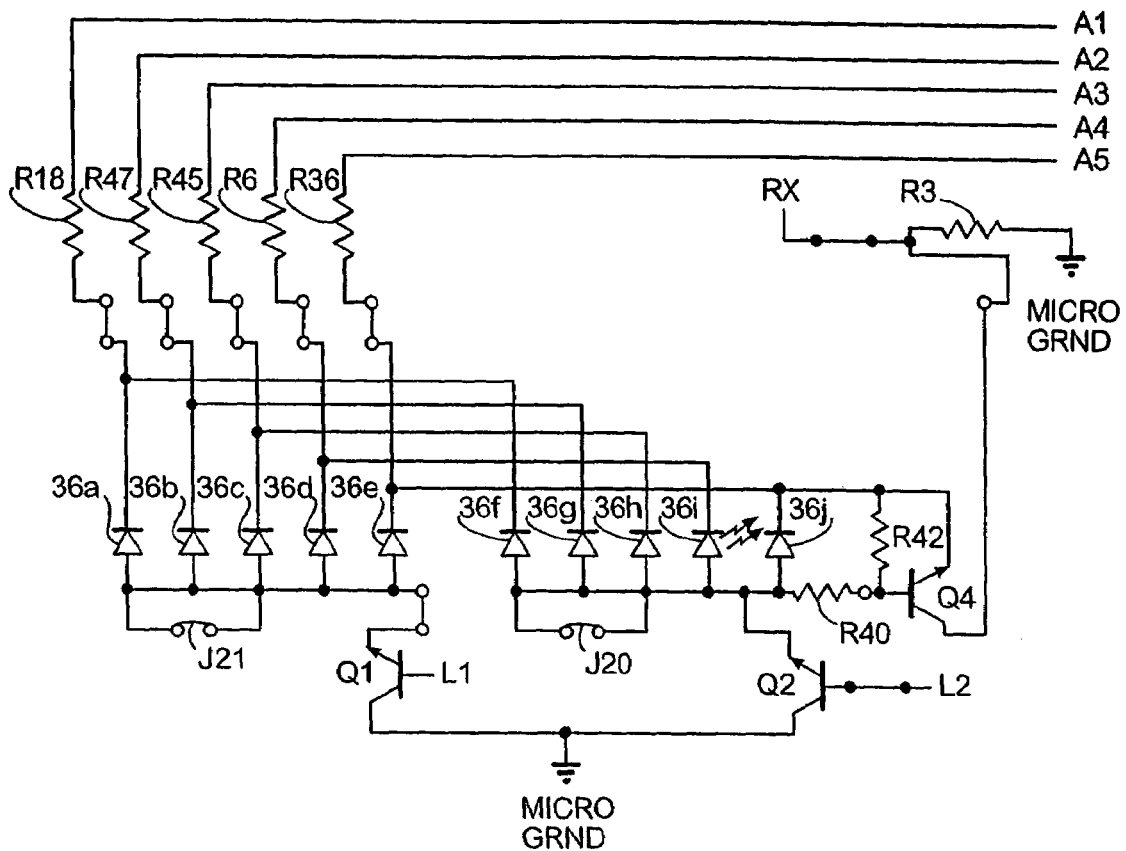
FIG. 9A is a schematic diagram of an exemplary indicator light circuit that may be used to operate one indicator light as an optical transmitter and another indicator light as an optical receiver.

FIG. 9A shows a schematic diagram of the portion of the exemplary control circuit that includes optical I/O circuit 14. Optical I/O circuit 14 includes the plurality of indicator lights 36a through 36i which in the exemplary embodiment described herein are standard light emitting diodes ("LEDs"), such as those LEDs sold by AGILENT of Palo Alto, Calif. and designated by part number HLMP3301. Optical I/O circuit 14 may also further include optical detector 37 in the form of a detector LED, such as those sold by Fairchild Semiconductor of South Portland, Me. and designated by part number MV-8111.

In general, indicator lights 36a through 36i are operably connected to microcontroller U1. Microcontroller U1 controllably energizes indicator lights 36a through 36i at select times during the operation of the dishwasher. In particular, microcontroller U1 controllably energizes indicator lights 36a through 36i during dishwasher operation as now described. Indicator light 36a is energized and thus lit when and if the "Hi-Temp Wash" option is selected by the operator (see FIG. 3). Microcontroller U1 similarly energizes indicator light 36b when and if the "Air Dry" option is selected by the operator (see FIG. 3). Microcontroller U1 likewise energizes indicator light 36c when and if the "2 Hour Delay" option is selected by the operator (see FIG. 3). Microcontroller U1 controllably energizes the indicator light 36d when and if the "4 Hour Delay" option is selected by the operator (see FIG. 3). Microcontroller U1 further controllably energizes indicator lights 36e through 36i that correspond to the indicia located adjacent to the lights 36e through 36i during operation of dishwasher 50 (see FIG. 3).

In the exemplary embodiment depicted in FIG. 9A, indicator lights 36a through 36i are coupled to the A1 to A5 outputs as well as the L1 and L2 outputs of microcontroller U1. A first LED driver transistor Q1 is coupled between a microcontroller output L1 and the anodes of each indicator light 36a through 36e. A second LED driver transistor Q2 is coupled between a microcontroller output L2 and the anodes of each indicator light 36f through 36i. The cathodes of indicator lights 36a and 36f are coupled through a 220 ohm resistor R18 to an A1 output of microcontroller U1. The cathodes of indicator lights 36b and 36g are coupled through a 220 ohm resistor R47 to an A2 output of microcontroller U1. The cathodes of indicator lights 36c and 36h are coupled through a 220 ohm resistor R45 to an A3 output of microcontroller U1. The cathodes of indicator lights 36d and 36i are coupled through a 220 ohm resistor R6 to an A4 output of microcontroller U1. The cathode of indicator light 36e is coupled through a 220 ohm resistor R36 to an A5 output of microcontroller U1. Accordingly, the microcontroller energizes each indicator light 36x by providing an output signal on a unique combination of either L1 or L2 and one of A1, A2, A3, A4 and A5. For example, to energize indicator light 36h, the microcontroller controls both L2 and A3.

In accordance with one aspect of the present invention, optical I/O circuit 14 may control one or more of indicator lights 36a to 36i as an optical communication device to effectuate communication between microcontroller U1 and an external diagnostic tool. Use of one or more of the indicator lights as both an indicator light and an optical communication device reduces the need for adding an optical component to function as an optical communication device.

In the exemplary embodiment shown in FIG. 9A, indicator light 36i is controlled to operate as an optical transmitter as well as an indicator light as described above. An optical detector 37, FIG. 9B, may be added to optical circuit 14 to operate as an optical receiver but does not operate as an indicator light. However, one of the indicator lights 36a to 36i may be operated as an optical receiver by modifying the circuitry associated with the selected indicator light. To simplify the description of this implementation, indicator light 36j is shown configured for operation as an optical receiver in FIG. 9A. To enable this implementation, indicator light 36j also requires access to the surface of control panel 52 as the other indicator lights have as shown in FIG. 4. As shown in FIG. 9A, indicator light 36j has its anode coupled to the emitter of transistor Q2 and its cathode coupled to microcontroller output A5 through resistor R36. A voltage divider comprised of R40 and R42 is coupled across indicator light 36j and the intermediate node of the divider is coupled to the base of transistor Q4. The emitter of Q4 is coupled to the cathode of indicator light 36j and one end of resistor R42 while the collector of Q4 is coupled to ground through resistor R3. When dishwasher 50 is not operating as a dishwasher, microcontroller U1 holds L2 at a high impedance state while output A5 is held at a negative bias so a light pulse impinging on indicator light 36j causes a voltage drop to occur across indicator light 36j. The resulting voltage is presented at the base of transistor Q4 to forward bias the transistor so ground is coupled through R3 and Q4 to the negative potential on output A5. Thus, the voltage on the RX pin of microcontroller U1 drops to indicate the light pulse of the optical signal. The absence of a light pulse causes the signal at the RX pin to return to ground. Consequently, the configuration of indicator light 36j with Q4, R40, R42, and R3 enables indicator light 36j to operate as an optical receiver when microcontroller U1 holds output A5 at a negative potential.

As discussed above in connection with FIG. 4, indicator light 36i is located adjacent optical detector 37. This placement of the components that may be operated as an optical transmitter and optical receiver in proximity to one another enables the communication probe, described in more detail below, to be designed with a more compact housing for its optical transmitter and receiver. In an embodiment of the present invention, two indicator lights may be selected to be operated as an optical transmitter and an optical receiver. Preferably, the two selected indicator lights are located in different groups of indicator lights 36a to 36i. That is, one indicator light selected to be an optical communication device, such as an optical transmitter, may be located in the group of indicator lights 36a to 36e coupled to microcontroller U1 through communication control component, transistor Q1, and another indicator light selected for operation as an optical communication device, such as an optical receiver, may be located in the group of indicator lights 36f to 36j coupled to microcontroller U1 through common control component, transistor Q2. This arrangement enables microcontroller U1 to operate independently the two selected indicator lights. Preferably, the two indicator lights selected for operation as optical communication devices are also located in proximity to one another to enable the communication probe to be designed more compactly. Thus, for example, indicator light 36b is preferably paired with 36f or 36g (FIG. 4) for operation as an optical transmitter and receiver pair while indicator light 36c is preferably paired with 36g or 36h for operation as an optical transmitter and receiver pair.

Figure 9B:
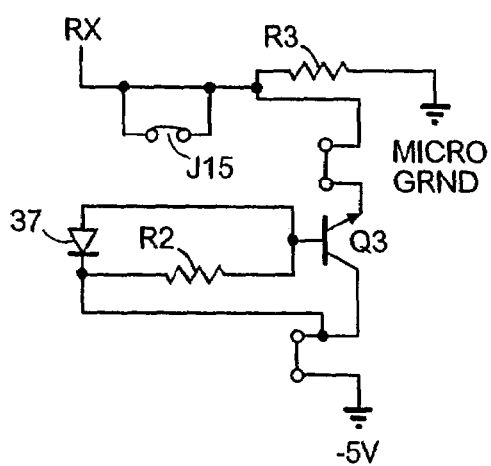
FIG. 9B is a schematic diagram of an alternative implement of an optical receiver using a photodetector that does not operate as an indicator light.

If one of the indicator lights is not configured as an optical receiver, then an optical detector may be separately provided as an optical receiver. An optical detector 37 may be configured and coupled to microcontroller U1 as shown in FIG. 9B to operate as an optical receiver. As shown in that figure, optical detector 37 is coupled through a transistor Q3 to an RX input of microcontroller U1. In particular, the anode of optical detector 37 is connected to the base of transistor Q3, which is an NPN bipolar junction transistor, and the cathode of optical detector 37 is coupled to a bias voltage supply (−5V). The emitter of transistor Q3 is also coupled to the bias voltage supply (−5V). A 220 k-ohm bias resistor R2 is coupled between the bias voltage supply and the base of transistor Q3 while the collector of transistor Q3 is coupled to ground through a 47 k-ohm bias resistor R3. The RX input of microcontroller U1 is coupled to the collector of the transistor Q3 to receive an electrical signal that corresponds to the optical signal stimulating optical detector 37. In the exemplary embodiment described herein, indicator lights 36a through 36i, optical detector 37, resistor R2 and transistor Q3 are disposed on secondary PCB 64. All other elements are disposed on primary PCB 62. (FIG. 5).

In operation, indicator light 36*i* may function as an optical transmitter and the optical detector 37 may function as an optical receiver. For transmission of data signals, microcontroller U1 provides control signals at its L2 and A4 output to transmit data. Microcontroller U1 may negatively bias indicator light 36*i* by applying a negative potential to the cathode through the A4 output and then drive the base of transistor Q2 with a serial data signal to transmit a data stream through indicator light 36*i* operating as an optical transmitter. Alternatively, microcontroller may hold L2 at ground and then selectively bias the cathode of indicator light 36*i* with a data signal on A4 to transmit a data stream through indicator light 36*i* operating as an optical transmitter. Either method of operation enables indicator light 36*i* to respond to a data signal and generate a corresponding optical signal that may be received by an optical receiver so control panel 52 of dishwasher 50 communicates data to an optical external receiver of the appliance.

For reception of data signals from an external transmitter, optical detector 37, FIG. 9B, is selectively stimulated by light/optical signals from an external optical transmitter. A light pulse in the optical signal causes optical detector 37 to be forward biased so a voltage is presented at the base of transistor Q3 that provides a forward bias on the base/emitter leg of transistor Q3. When the base/emitter leg is forward biased then the collector of transistor Q3 is coupled to the negative bias supply coupled to the emitter and the voltage at RX drops significantly. Thus, an electrical signal corresponding to the optical signal impinging on optical detector 37 is produced on the RX input of microcontroller U1 so microcontroller U1 may receive a data message from an external source.

Operating indicator light 36*i* and optical detector 37 as optical communication devices enables an appliance, such as dishwasher 50, to communicate with an external device. Preferably, the external processing device is a diagnostics tool that includes one or more digital processing circuits. The diagnostics tool may receive diagnostic or other information from microcontroller U1 through indicator light 36*i*. Data messages may be sent from the diagnostic tool to the appliance through optical detector 37 or one of the other indicator lights configured to operate as an optical receiver as shown in FIG. 9A.

In some appliances, vacuum fluorescent displays (VFD) are used to provide indications of the operations of an appliance rather than indicia and indicator lights. A VFD, as shown in FIG. 10, typically includes a glass substrate 232 on which semiconductor circuits, such as circuit 234, and a plurality of phosphor pixels 236 are laid. Glass substrate 232 may be covered with a dark layer 238 to provide contrast to excited pixels for better visibility of the character displayed with pixels 236 on circuit 232. A plurality of semiconductor circuits is driven to selectively energize the phosphor pixels and generate characters to display data regarding the operation of the appliance. However, the phosphor pixels may not produce adequate light for optical communication or the processing overhead for controlling one or more pixels as low intensity optical transmitters and receivers may be too resource intensive for implementation.

In order to provide an optical interface in an appliance that uses a VFD, a LED or other indicator light may be mounted behind the display. As long as the display background is optically transmissive, a light mounted behind the display may be controlled to generate an optical signal containing appliance data and an optical detector may receive an optical signal from an external device, such as an optical probe, through the display. If the display has a background that blocks or severely attenuates optical signals, an aperture 242 may be provided in the vacuum fluorescent display, preferably through the dark background, so it is aligned with an indicator light mounted behind the VFD. Preferably, two apertures 242 are formed in the VFD and two indicator lights are mounted behind the VFD so the appliance may operate the two indicator lights as an optical transmitter and an optical receiver. Most preferably, the two apertures are formed at a location that has sufficient spatial separation from one another to reduce the likelihood of reflected light causing optical noise yet they are sufficiently close to one another that the communication probe housing remains compact.

As shown in FIG. 10, a first aperture 242*a* is located on one side of semiconductor circuit 234 and a second aperture 242*b* is located on the opposite side of semiconductor circuit 234. Apertures 242*a* and 242*b* may be etched or otherwise formed in a dark background 238 when the display is manufactured. Apertures 242*a* and 242*b* are located so each one aligns with a LED or other indicator light mounted behind the display. When the LEDs are configured as described above, one may be operated to transmit a light signal that passes through aperture 242*a*, for example, so it may be received by an optical receiver of a communication probe. Likewise, the other indicator light may be operated as an optical receiver so a light signal may be received through aperture 242*b*. The optical receiver may also be implemented with an optical detector or phototransistor mounted underneath the display in alignment with one of the apertures. When configured as described above, the optical detector or phototransistor responds as an optical receiver.

By providing an aperture 242*a*, 242*b* in the dark background 238 of a VFD 230 so an optical transmitter and receiver may be aligned with a first and a second indicator light mounted behind the display, an optical interface is provided for an appliance that uses a VFD rather than indicator lights and indicia for the display of operational data. When the VFD includes a dark layer and the apertures are formed within the dark layer, reflected light that is not substantially aligned with one of the apertures is absorbed by the dark material surrounding the apertures. Consequently, the indicator lights being operated as an optical transmitter and an optical receiver are less prone to optical noise arising from reflected light. This is also the case to some extent when the indicator lights are located behind a VFD that does not have a dark layer because the VFD is typically darker than the surface of the appliance control panel outside the region in which the display is mounted.

Figure 11:
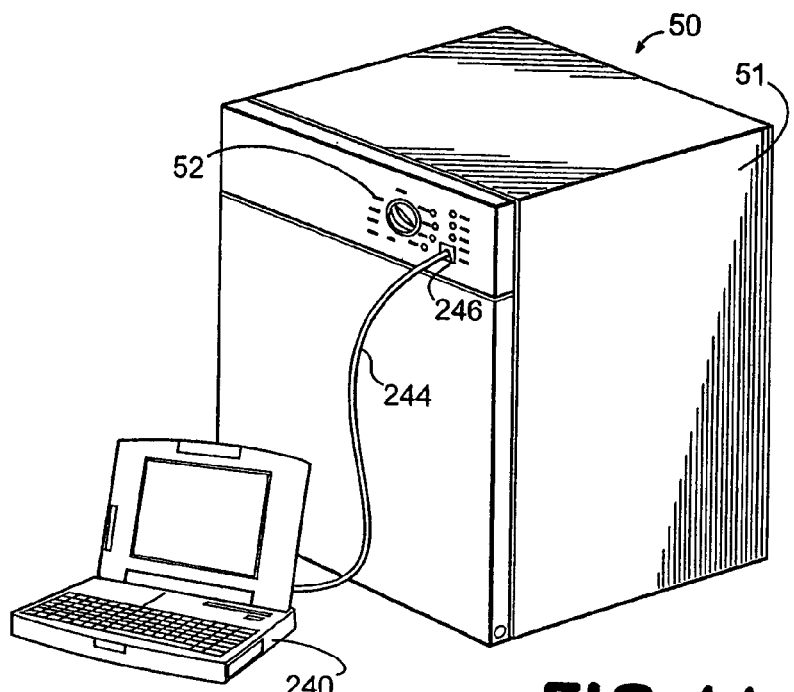
FIG. 11 shows an exemplary arrangement in which a diagnostic tool is configured to communicate with a control circuit of the dishwasher of FIG. 1 through a communication probe.

FIG. 11 shows an exemplary arrangement in which an exemplary diagnostic tool 240 in the form of a handheld computer is configured to obtain information from microcontroller U1 through indicator light 36*i* and optical detector 37 located on central panel 52 when they are operated as an optical transmitter and receiver, respectively. While diagnostics tool 240 is shown as a handheld computer or personal digital assistant, diagnostic tool 240 may be any other type of portable computer. Also, diagnostic tool 240 may be a stationary computer located, for example, at the end of an appliance assembly line for the purpose of verifying appliances through an optical interface before shipping the appliance to retail outlets.

As shown in FIG. 11, diagnostic tool 240 is electrically coupled by electrical cable 244 to a communication probe 246. Communication probe 246 is configured for optical communication with dishwasher 50. Specifically, communication probe 246 includes an optical transmitter and an optical receiver that are spaced apart at a distance that approximates the distance between optical detector 37 and indicator light 36i. The optical transmitter and optical receiver of communication probe 246 are arranged so when the optical transmitter is aligned with optical detector 37, then the optical receiver of probe 246 is aligned with indicator 36i. Electronics are also provided in communication probe 246 so an optical signal received from indicator light 36i of dishwasher 50 is converted into an electrical data signal and returned via cable 244 to diagnostic tool 240 for processing. Diagnostic tool 240 may send data messages to dishwasher 50 by sending a data signal via cable 244 to probe 246 where it is converted into an optical signal by the optical transmitter of probe 246. The optical signal transmitted from the optical transmitter of probe 246 may be received by optical detector 37 of dishwasher 50 and the corresponding electrical signal received on the RX input of microcontroller U1 for processing. Thus, a low intensity optical interface to dishwasher 50 is obtained from the use of one or more indicator lights already available on an appliance such as dishwasher 50. Because the indicator lights of an appliance are relatively low intensity, communication probe 246 needs to be located closely to control panel 52 of dishwasher 50. The spatial relationships of the optical transmitter and receiver of probe 246 and the indicator light 36i and optical detector 37 are discussed in more detail below.

While the exemplary embodiment of the present invention shown in FIG. 11 depicts a cable 244 coupling probe 246 to diagnostic tool 240, probe 246 may be coupled directly to diagnostic tool 240 or incorporated within the housing of diagnostic tool 240. In this arrangement, tool 240 is brought into proximity of indicator light 36i and optical detector 37 for communication with dishwasher 50 through control panel 52. However, this arrangement requires either the user to hold diagnostic tool 240 in alignment with indicator 36i and optical detector 37 or couplers 268 require strengthening to secure diagnostic tool 240 to control panel 52. Thus, the use of cable 244 to couple probe 246 to diagnostic tool 240 is preferred.

Figure 12:
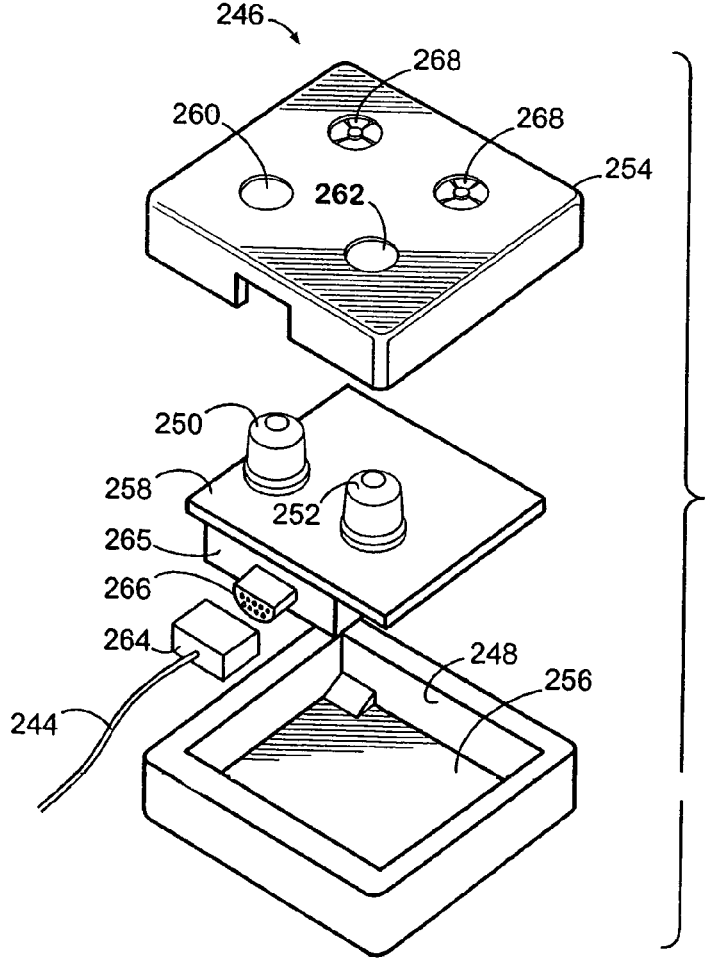
FIG. 12 shows an exploded view of the communication probe of FIG. 11.

FIG. 12 shows an exploded view of an exemplary embodiment of communication probe 246 in further detail. Communication probe 246 includes a housing formed by a back member 248 and a front member 254 to provide an interior 256. Communication probe 246 further includes an optical receiver 250 and an optical transmitter 252 mounted on support 258 for placement within the housing. Support 258 may be a printed circuit board that is secured within interior 256. Front member 254 includes apertures 260 and 262 that align with receiver 250 and transmitter 252 when the housing is assembled so the receiver 250 and transmitter 252 may optically communicate with elements external to the housing. Apertures 260 and 262 may be completely open or they may include a substantially transparent (or otherwise optically transmissive) element, such as a lens.

Communication probe 246 further includes an electronics module 265 containing electronics for driving optical transmitter 252 in accordance with data signals received from diagnostic tool 240 and for transmitting signals received by optical receiver 250 to diagnostic tool 240. The electronic components of module 265 may be attached to and electronically coupled together via a printed circuit on support 258. Electronics module 265 may include a connector 266 for receiving connector 264 of cable 244 to couple the conductors within cable 244 to the electronics within module 265. Connector 266 also couples the electronics of module 265 to supply voltage signals from diagnostics tool 240. Preferably, a RS-232 integrated circuit in module 265 converts the voltage supply signals received from diagnostic tool 240 to voltage levels appropriate for use within a preferred embodiment of probe 246. In the exemplary embodiment shown in FIG. 12, connectors 264 and 266 are RS-232 connectors having nine pins each. However, other pin arrangements and numbers of pins may be used. Of course, other electrical specifications and connector arrangements may be used without departing from the principles of the present invention.

Probe 246 may be provided with housing couplers 268 for removably securing probe 246 to control panel 52 for optical communication between receiver 250 and transmitter 252 of probe 246 and indicator light 36i and optical detector 37 of dishwasher 50 when they are operated as an optical transmitter and receiver as discussed above. Couplers 268 may be one or more suction cups for engaging the surface of control panel 52 or they may be one or more magnets provided control panel 52 is comprised of a material such as sheet metal that is attracted to magnets.

In operation, a user aligns optical transmitter 252 and optical receiver 250 of probe 246 with indicator light 36i and optical detector 37, respectively. The probe is advanced toward control panel 52 until couplers 268 engage panel 52 and communication probe 246 is secured to the panel so optical receiver 250 and transmitter 252 are aligned with and in close proximity to indicator light 36i and optical detector 37, respectively, for the optical communication of data between diagnostic tool 240 and dishwasher 50. If some misalignment occurs, the user may slide probe 246 in any direction along the control panel 52 until diagnostic tool 240 and the microcontroller U1 establish communications, signifying that optical receiver 250 and transmitter 252 are sufficiently aligned with indicator light 36i and optical detector 37 for communication.

Other types of couplers may also be used to secure probe 246 in proximity to control panel 52. For example, mechanical mounts may be disposed on probe 246 to cooperate with mechanical features of dishwasher frame 51 to align the optical transmitter and receiver of probe 246 with indicator light 36i and optical detector 37 of control panel 52. Indeed, the shape of probe 246 may be used to couple probe 246 to panel 52 if corresponding alignment supports are disposed on dishwasher control panel 52. However, the use of magnets or suction cups provides the added advantage of not requiring any special mechanical modifications to existing appliance panels.

FIGS. 13 and 14 show exemplary flow diagrams of operations carried out in a typical communication operation between diagnostic tool 240 and microcontroller U1. FIG. 13 shows the operations of diagnostic tool 240 during communication with an appliance and FIG. 14 shows the corresponding operations of microcontroller U1 during communication with a diagnostic tool 240.

Referring to FIG. 13, diagnostic tool 240 may begin communication operations by generating a handshake or "wake-up" message or signal pattern on a free-run, repeating basis (block 302). The "wake-up" message is repeated until an acknowledgement message or signal is received by diagnostic tool 240 from the appliance with which tool 240 is communicating (block 304). In response to receipt of the acknowledgement message, diagnostic tool 240 preferably provides a visible or audible signal confirming to a human operator that communications with the appliance control circuit have been established. This confirmation signal may be used to assist a technician in aligning the optical transmitter and receiver of communication probe 246 with indicator light 36i and optical detector 37 on control panel 52. The technician stops moving probe 246 once the visible or audible indication is received (block 304).

Thereafter diagnostic tool 240 formulates a data request message (block 306). In particular, diagnostic tool 240 may form a data message that requests a specific type of data from microcontroller U1. As discussed further below, microcontroller U1 may be configured to store a variety of diagnostic or operational statistics and data. Accordingly, diagnostic tool 240 may request a particular subset of the data stored by microcontroller U1. Diagnostic tool 240 may employ any number of mechanisms to allow a user to specify the types of data to be retrieved from dishwasher control circuit 10. In an alternative embodiment, the type of data retrieved from microcontroller U1 may be predetermined, thereby potentially eliminating the need for formulation of a data request message.

The method continues with diagnostic tool 240 receiving data from microcontroller U1 in response to the transmission of a data request message and determining whether the received data are valid (Block 308). To this end, diagnostic tool 240 checks for data integrity using any of a plurality of known methods and also determines whether the received information is in the correct data protocol. If valid data are not received, then diagnostic tool 240 may formulate another request (block 306) and retransmit the data request message. If, however, valid responsive data are received, then diagnostic tool 240 may store, print and/or display information based on the received data (block 310). Diagnostic tool 240 may further process the data prior to displaying or printing or it may display or print the retrieved data directly.

Diagnostic tool 240 may determine whether any additional data are to be requested from dishwasher control circuit 10 (Block 312). For example, diagnostic tool 240 may query the technician or operator via a screen display as to whether additional data are to be requested (block 306). If additional data are to be requested, then diagnostic tool 240 may generate another data request message (block 306). Otherwise, diagnostic tool 240 has completed the communication operation. Further processing, displaying and printing of the retrieved data or information derived therefrom may be accomplished after the communication operations have been completed.

FIG. 14 shows the operations of microcontroller U1 that may be performed in conjunction with the communication operation described in FIG. 13. Microcontroller U1 may periodically scan the RX input for the handshake or "wake-up" signal generated by diagnostic tool 240 (block 322). Such periodic scanning may occur during dishwasher operations using typical interrupt or polling processing. Because the operation of dishwasher 50 is typically not computationally intensive, periodic scanning may be readily carried out several times per second without degrading the performance of the dishwashing operations described above in connection with FIG. 3. Microcontroller U1 determines if a handshake or "wake-up" signal has been detected (block 324) and if microcontroller U1 does not recognize a handshake message then microcontroller U1 continues its periodic scanning (block 322) until a handshake signal is detected.

When microcontroller U1 does recognize an appropriate handshake or "wake-up" signal (block 324), then microcontroller U1 transmits an acknowledgement message to diagnostic tool 240 using indicator light 36i (block 326). Microcontroller U1 then receives a data request message generated by diagnostic tool 240 via optical detector 37 and parses the message to determine the type of data being requested by diagnostic tool 240 (Block 328). The requested diagnostic data may be stored locally within microcontroller U1 or in EEPROM U5. The diagnostic data typically communicated from dishwasher 50 include data gathered and stored during operation of the dishwasher 50. Such data may include statistics or information regarding detected out-of-boundary conditions. For example, microcontroller U1 may record an out-of-boundary event if the temperature sensor reaches a certain temperature or if the temperature fails to reach a particular temperature. Other diagnostic data may include a count of the number of cycles run by the machine, the number of hours motor 16a has operated, or similar usage information. The exact nature of the type of diagnostic information obtained, and the manner in which it is stored, varies based on the needs and strategies of a particular implementation.

Microcontroller U1 retrieves the requested data from the memory (e.g., internal memory or EEPROM U5) and, if necessary, processes the raw data to obtain the type of data requested (block 330). Microcontroller U1 transmits the retrieved data to diagnostic tool 240 via indicator light 36i (Block 332). To this end, microcontroller U1 configures the responsive data message to the format expected by diagnostic tool 240.

Microcontroller U1 determines whether any further data request signals are generated (block 334). If no such new requests are received before a time-out period, then microcontroller U1 continues to periodically monitor for a handshake or "wake-up" signal (block 322). If an additional request is received, then microcontroller U1 receives and implements the data request (block 328). Alternatively, microcontroller U1 may return directly to scanning for handshake signals (block 322) without checking for an additional data request message (block 334). In this implementation of the method, additional requests are handled in the same manner as the original data request.

A system and method for implementing the management of the communication between probe 246 and an appliance through an optical interface are disclosed in co-pending patent application entitled System and Method for Communicating with an Appliance Through an Optical Interface Using a Control Panel Indicator and having Ser. No. 10/348,305 that was filed on Jun. 24, 2003. That application is owned by the assignee of the present application and is hereby expressly incorporated in its entirety by reference.

One exemplary embodiment of power and data couplings between diagnostic tool 240 and communication probe 246 is shown in FIG. 15. Diagnostic tool 240 is shown to be a handheld computer that includes a power supply 278, a microprocessor 270 and communication interface 272. Of course, diagnostic tool 240 may have other electronics including, but not limited to, display drivers, memory and user interface electronics. Interface 272 couples power conductors 274 of cable 244 to power supply 278 and couples data conductors 276 of cable 244 to microprocessor 270. The number of power conductors 274 and data conductors 276 may differ from the number of power and data conductors shown in FIG. 15.

Preferably, communication interface 272 is an RS-232 interface available in most handheld computers, such as a Palm Pilot personal digital assistant. However, interface 272 may be any type of communication interface that typically generates reference voltage signals for transmission over power conductors 274 of cable 244. With reference to FIG. 15, connector 266 receives the reference voltage signals on power conductors 274 and delivers them to power supply 280 for use within probe 246. Power supply 280 distributes the reference voltage signals within probe 246 for powering components and may include a voltage converter for converting, if necessary, the reference voltage signals into other voltage levels appropriate for powering the electronics within probe 246. Preferably, power supply 280 includes an RS-232 interface integrated circuit that generates the RS-232 reference voltage signals of +12V and −12V from the reference voltage signals of +5V and ground (GRND). These voltage signals may be used by the electronics within probe 246, for example, to power communication driver 282. Communication driver 282 generates an electrical data signal corresponding to the optical signal stimulating optical receiver 250 for transmission to diagnostic tool 240 through one or more of the conductors 276. Communication driver 282 also provides the data signal received from diagnostic tool 240 to optical transmitter 252 for transmission to indicator light 36i.

Figure 16A:
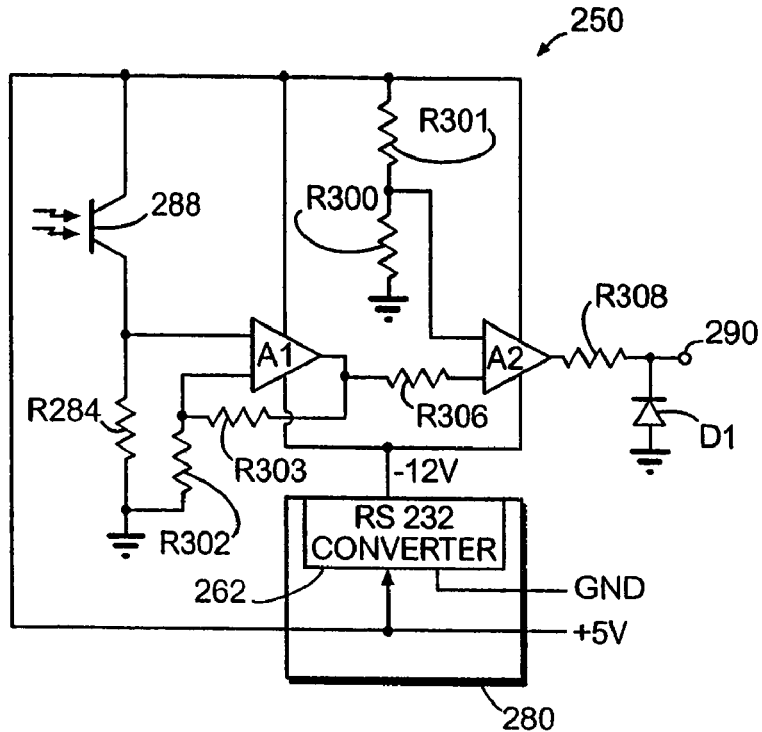
FIG. 16A is a schematic diagram of the optical receiver of the communication probe of FIG. 12.

FIG. 16A shows an embodiment in which a −12V reference voltage signal is applied to optical receiver 250. Optical receiver 250 may be comprised of a phototransistor 288 and an amplifier network that includes amplifiers A1 and A2. Preferably, amplifiers A1 and A2 are high speed operational amplifiers. Resistor R284 is coupled between the emitter of phototransistor 288 and ground so a signal voltage is provided to one of the inputs of amplifier A1 when light impinges on phototransistor 288 and causes it to conduct current from its collector to its emitter. Resistors 302 and 303 set the gain for amplifier A1 in a known manner, Preferably, the gain for amplifier A1 is set to thirteen (13). Amplifier A2 is operated as a comparator. A voltage divider comprised of R301 and R300 provide a reference voltage at the node shared by the resistors. This reference voltage, which is preferably 0.63 volts, is provided to the one of the inputs for amplifier A2 while the output of amplifier A1 is supplied to the other input of amplifier A2 through an input resistor R306. The output of amplifier A2 is rectified by resistor 308 and diode D1 to provide an electrical signal at node 290 that corresponds to the light signal impinging on phototransistor 288. Preferably, the −12V voltage from the RS-232 converter and the +5V voltage are provided to operational amplifiers A1 and A2 as operating voltages for the amplifier network. By using the −12V signal from RS-232 converter rather than the electrical ground signal supplied through the cable, the operational amplifiers A1 and A2 are operated in a high speed mode. Thus, the inclusion of the RS-232 converter in communication probe 246 improves the response of the optical receiver 250. The maximum baud rate for the improved optical receiver is 56K baud.

Figure 16B:
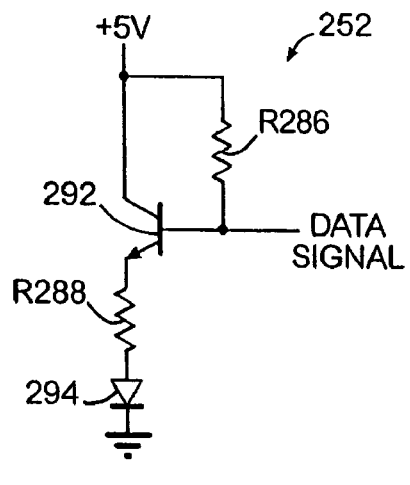
FIG. 16B is a schematic diagram of the optical transmitter of FIG. 12.

FIG. 16B depicts an exemplary construction of optical transmitter 252 comprised of a NPN transistor 292, a LED 294, and two resistors R286 and R288. Resistor R286 is coupled between the collector of transistor 292 and the base of transistor 292. LED 294 and resistor R288 are coupled in series between the emitter of transistor 292 and ground. A data signal provided from diagnostic tool 240 through cable 244 to communication driver 282 is supplied to the base of transistor 294. When the data signal has a logical high value, the base/emitter leg of transistor 294 is forward biased and the +5V power supply is coupled from the collector to electrical ground through LED 294 and resistor 288 so LED 294 is stimulated to generate light. Otherwise, the data signal does not turn on transistor 292 and LED 294 remains off. In this manner, an electrical data signal may be used to generate a corresponding light signal.

In one embodiment of the present invention, LED 294 is the same type of LED as indicator light 36i and phototransistor 288 is the same type of optical detector as optical detector 37. Preferably, either LED 294 is a high intensity LED that generates light that is more intense than the light from indicator light 36i or phototransistor 288 is a sensitive phototransistor that responds to light more quickly than optical detector 37. Most preferably, LED 294 is a high intensity LED and phototransistor 288 is a sensitive phototransistor. The use of components in probe 246 that are different than those in dishwasher 50 enhances the effectiveness of communication between dishwasher 50 and probe 246 without requiring modification to dishwasher 50. Furthermore, this reduces the likelihood that optical detector 37 is stimulated by stray light signals from the ambient environment. Optical detector 37 may be especially vulnerable to stray light signals while control panel 52 is not engaged to the probe 246 and optical detector 37 is uncovered. By making the optical transmitter of probe 246 more intense rather than making optical detector 37 more sensitive, optical communication is improved without making the appliance more sensitive to light signals when the appliance is not in its communication mode.

Preferably, a high intensity LED 294 is one that generates light pulses at a brightness level approximately between 8000 millicandelas and 31,000 millicandelas at 20 ma through the LED. A standard LED, such as that used for indicator lights 36a–36i, typically generate light in the range of 4 to 7 millicandelas. Preferably, a sensitive phototransistor is one that generates a collector photo current of 5 to 15 mA in response to a light pulse of 100 lx. On the other hand, an optical detector, such as optical detector 37, generates 50 to 100 μA when stimulated by a light pulse of 1 mW/cm$^2$. As noted above, a standard LED may also be used as an optical receiver. When a LED is configured to be an optical receiver, the LED is estimated to generate a current of 50 to 100 μA in response to a light pulse that of 1 mW/cm$^2$. A high intensity LED is available from Agilent of Palo Alto, Calif. and designated by part number HLMP-EG08-Y2000. A sensitive phototransistor is available from Panasonic of Secaucus, N.J. and designated by part number PNZ-108. This type of sensitive phototransistor generates sufficient current to generate an electrical data signal in response to light in a range as low as approximately 10 lx to 30 lx.

Figure 17:
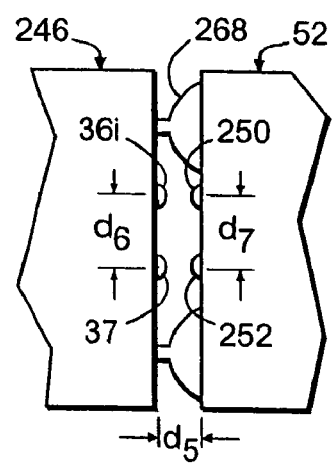
FIG. 17 is a diagram of the mounting of the optical transmitter and receiver of the communication probe of FIG. 12 in proximity to the indicator light and the photodetector of an appliance for optical communication.

FIG. 17 illustrates communication probe 246 being engaged with control panel 52 for bi-directional optical communication between diagnostic tool 240 and dishwasher 50. In FIG. 17, indicator light 36i is substantially aligned with optical receiver 250 of probe 246 and optical detector 37 is substantially aligned with optical transmitter 252. Preferably, distance d5 shown in FIG. 17 is no more than 20 mm as that is approximately the maximum distance that a standard LED, such as indicator light 36i, is able to effectively transmit a light signal. Distances d6 and d7 are approximately the same so optical transmitter 252 may be aligned with optical detector 37 while optical receiver 250 is also aligned with indicator light 36i. This distance is preferably no less than 12 mm to reduce the likelihood of cross-talk between the two aligned optical communication paths shown in FIG. 17. Preferably, distance d7 in probe 246 is designed to accommodate the spatial separation of the indicator light and optical detector pair or indicator light pair selected to be operated as an optical transmitter and receiver at the appliance. Probe 246 may be secured to control panel 52 via couplers 268 as discussed above in connection with FIGS. 11 and 12.

The optical signal transmitted from indicator light 36i to optical receiver 250 may have the same or opposite logical polarity as the optical signal transmitted from optical transmitter 252 to optical detector 37. That is, both optical transmitter 252 and indicator light 36i may have the same logical polarity by transmitting a light pulse to represent a logical '1' or both may be turned off to represent a logical '1' when probe 246 is coupled to dishwasher 50 for communication. Preferably, however, indicator light 36i and optical transmitter 252 transmit light signals having opposite logical polarity by having indicator light 36i transmit a light pulse to represent a logical '1' while optical transmitter 252 may be turned off to represent a logical '1' in its transmitted data stream. Alternatively, opposite logical polarity may be achieved by turning off indicator light 36i to represent a logical '1' while optical transmitter 252 sends a light pulse to represent a logical '1' in its transmitted data stream. The use of optical signals having opposite logical polarity improves noise immunity at optical receiver 250 and optical detector 37. Most preferably, as shown in FIG. 18, indicator light 36i transmits a light pulse to represent a logical '0' while optical transmitter 252 is turned off to represent a logical '0' in its data stream. Furthermore, indicator light 36i and optical transmitter 252 continuously transmit a logical '0' when a data signal is not modulating the optical signal.

The above-described most preferred arrangement improves noise immunity at optical detector 37 and optical receiver 250 because the light from indicator light 36i is not as intense as the light optical transmitter 252 when a high intensity LED is used for transmitter 252. Thus, reflected light is less likely to impinge upon optical detector 37 at an intensity level sufficient to stimulate optical detector 37. Likewise, optical transmitter 252 is turned off so it does not contribute reflected light between probe 246 and control panel 52. When optical transmitter 252 does commence transmission, any reflected light arising from transmission of a logical '1' amplifies the logical '0' value being transmitted by a continuous light signal from indicator light 36i. Consequently, this logical scheme reduces the risk that reflected light causes the reception of erroneous signals, especially when only one of indicator light 36i and optical transmitter 252, is being modulated by a data signal.

In the embodiment depicted in FIG. 19, indicator light 36i is in an ON state while not transmitting information, i.e., no data signal is modulating indicator light 36i and optical transmitter 252 is in an OFF state while not transmitting information, as is desirable to reduce the occurrence of optical noise at the optical receiver 250. However, this result is not achieved by using opposite logic polarity at indicator light 36i and optical transmitter 252 as was described with reference to FIG. 18. Rather, both indicator light 36i and optical transmitter 252 generate data signals having the same logic polarity during transmission of data. When a modulating data signal is absent, however, indicator light 36i is maintained in an ON state. Conversely, optical transmitter 252 is maintained in an OFF state when a modulating data signal is absent. The ON state of indicator light 36i when the modulating data signal is absent may be implemented in software, as is well known to one of ordinary skill in the art.

Figure 20:
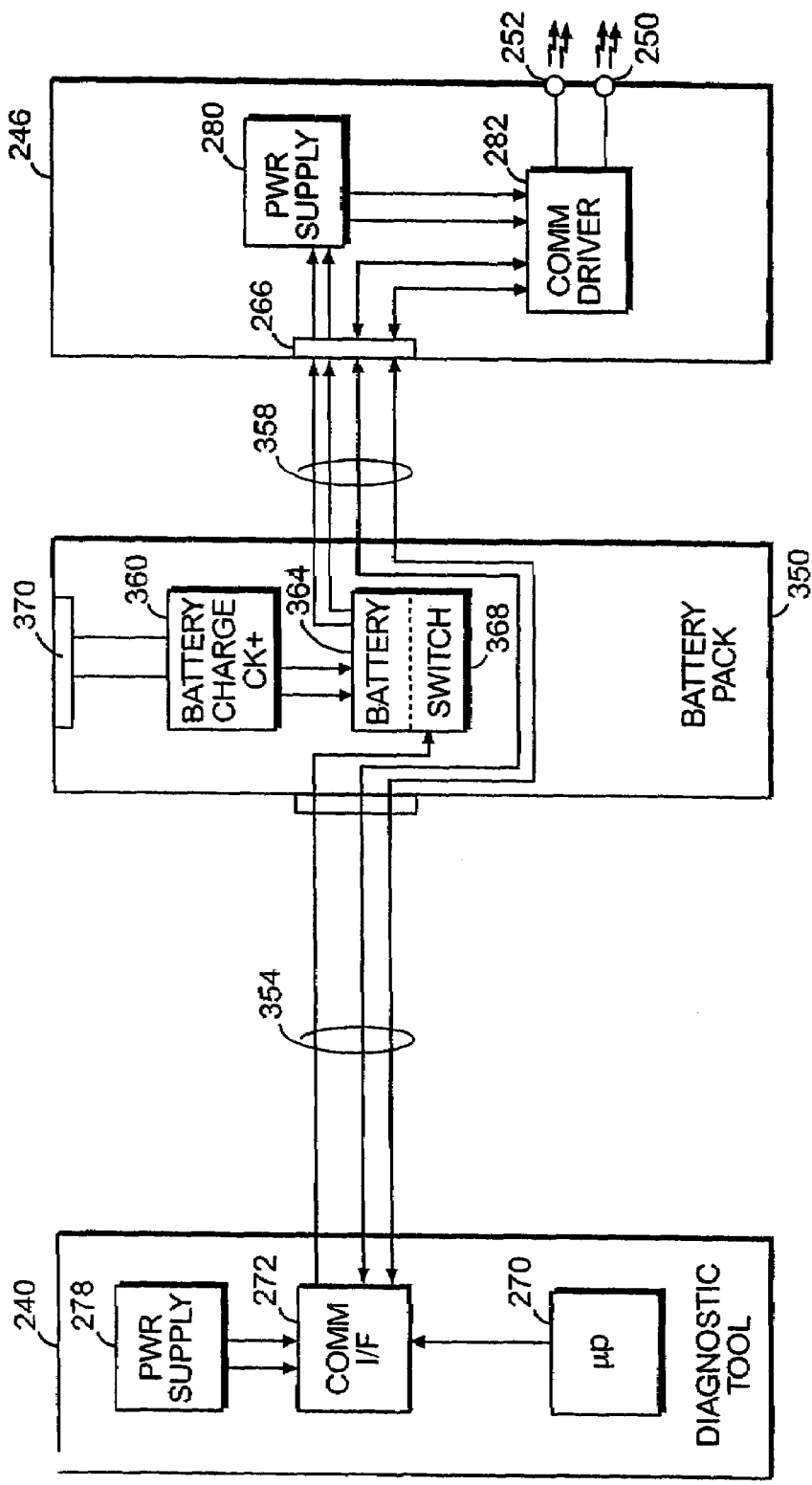
FIG. 20 is a block diagram of the communication probe and a battery pack coupled to one another through a cable.
Figure 21:
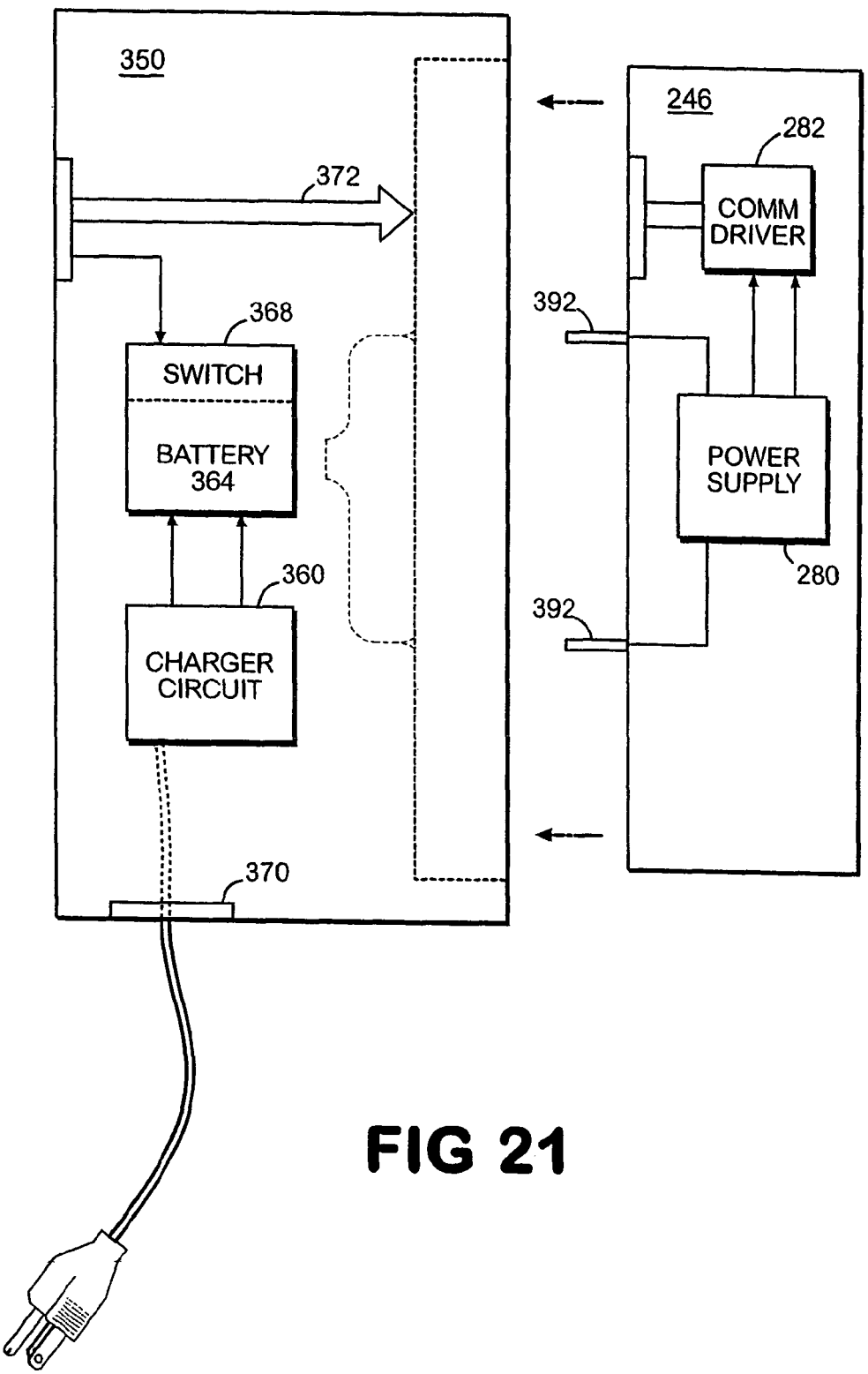
FIG. 21 is a depiction of a battery pack directly coupled to the communication probe through an interconnect.

In an alternative embodiment depicted in FIGS. 20 and 21, communication probe 246 is powered by an energy storage unit in the form of a direct current (DC) battery pack 350 instead of power signals from diagnostic tool 240. Battery pack 350 may be coupled between diagnostic tool 240 and communication probe 246 by cables 354 and 358. Battery pack 350 may include a battery charger circuit 360, a battery 364, and a switch 368. Cable 354 couples data signals between diagnostic tool 240 and battery pack 350 while cable 358 couples power and data signals between battery pack 350 and communication probe 246. Switch 368 couples the power leads of battery 364 to cable 358 so power may be delivered from battery 364 to communication probe 246. A power status signal, which indicates whether diagnostic tool 240 is in an active or sleep mode, is also coupled to switch 368. In response to the power status signal indicating diagnostic tool 240 is in sleep mode, switch 368 disconnects the power leads of battery 364 from cable 358 so battery 364 no longer provides power to probe 246. Otherwise, switch 368 couples the power leads from battery 364 to cable 358 for the delivery of electrical power to probe 246.

Preferably, diagnostic tool 240 includes a watchdog timer that microcontroller 270 keeps alive unless no user activity, such as a key depression, occurs. When the watchdog timer expires, microcontroller 270 puts diagnostic tool 240 in the sleep mode to conserve its internal battery. The corresponding change in the power status signal causes switch 368 to disconnect battery 364 from probe 246 as described above. Preferably, battery 364 is a lithium battery such as the one manufactured by Panasonic of Secaucus, N. J. and designated by part number CGA 103450, although other battery types may be used. Preferably, battery pack 350 includes a charger circuit 360 with an external connector 370 for coupling charger circuit 360 to a conventional AC current source. Charger circuit 360 converts AC current into an appropriate form for recharging battery 364. Of course, if disposable batteries are used for battery 364 then charger circuit 360 is not required for battery pack 350.

When microcontroller 270 responds to user activity, such as depression of a key on diagnostic tool 240, microcontroller 270 activates the watchdog timer to put the power status signal at its active state. In response, switch 368 couples battery 364 to probe 246 so the components of the probe are energized for communication with dishwasher 50. While cable 358 is shown coupling battery pack 350 to probe 246, battery pack 350 may be coupled directly to probe 246. To implement direct coupling, a data bus 372 couples the data signals communicated through cable 354 to the components within probe 246 and an interconnect 392 is provided between battery 364 and power supply 280 of probe 246. Probe 246 fits within the recess of battery pack 350 so interconnect 392 engages conductors that couple the circuitry of probe 246 to battery 364 of battery pack 350. Switch 398 selectively couples battery 364 to interconnect 392 in a manner similar to that previously described. Alternatively, battery pack 350 may be adapted so it may be directly coupled to the diagnostic tool. The cable from battery pack 350 then supplies power and communicates data signals with the communication probe as described above.

While the present invention has been illustrated by the description of exemplary processes and system components, and while the various processes and components have been described in considerable detail, applicant does not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. An optical interface for an appliance using indicator lights comprising:
   a vacuum fluorescent display; and
   a first indicator light mounted behind the vacuum fluorescent display (VFD) so that the first indicator light may be operated as an optical communication device for optical communication through the vacuum fluorescent display.

2. The optical interface of claim 1 wherein the VFD includes a dark layer covering a glass substrate and a first aperture is formed in the dark layer so that the indicator light may be aligned with the first aperture in the vacuum fluorescent display for enabling optical communication through the VFD.

3. The optical interface of claim 2 wherein the first aperture is located approximately equidistant from four phosphor pixels.

4. The optical interface of claim 1 further comprising:
   a second indicator light mounted behind the VFD so that the second indicator light may be operated as an optical communication device for optical communication through the VFD.

5. The optical interface of claim 4 wherein the first indicator light is operated as an optical transmitter and the second indicator light is operated as an optical receiver.

6. The optical interface of claim 5, the VFD further comprising:
   a dark layer covering a glass substrate; and
   a first aperture and a second aperture being in the dark layer so the first and second indicator lights are enabled for optical communication through the dark layer and the dark layer absorbs light not substantially aligned with either the first or the second aperture.

7. The optical interface of claim 6 wherein the first aperture is located approximately equidistant from a first group of four phosphor pixels and the second aperture is located approximately equidistant from a second group of four phosphor pixels.

8. A method for enabling optical communication with an appliance having a vacuum fluorescent display comprising:
   mounting a first indicator light behind a vacuum fluorescent display (VFD); and
   operating the first indicator light as an optical communication device for optical communication through the VFD.

9. The method of claim 8 wherein the first aperture formation includes:
   forming a first aperture in a dark layer covering a glass substrate of the vacuum fluorescent display.

10. The method of claim 9 wherein the first aperture formation includes:
    locating the first aperture approximately equidistantly from four phosphor pixels.

11. The method of claim 8 further comprising:
    mounting a second indicator light behind the vacuum fluorescent display; and
    operating the second indicator light as an optical communication device for optical communication through the VFD.

12. The method of claim 11 further comprising:
    operating the first indicator light as an optical transmitter; and
    operating the second indicator light as an optical receiver.

13. The method of claim 12 further comprising:
    forming a first aperture and a second aperture in a dark layer covering a glass substrate of the VFD so the first and second indicator lights are enabled for optical communication through the dark layer and the dark layer absorbs light not substantially aligned with either the first or the second aperture.

14. The method of claim 12 wherein the first aperture formation includes:
    locating the first aperture approximately equidistantly from a first group of four phosphor pixels; and
    the second aperture formation includes:
    locating the second aperture approximately equidistantly from a second group of four phosphor pixels.

15. An appliance enabled for optical communication with a diagnostic tool comprising:
    an appliance having a control panel;
    a vacuum fluorescent display mounted in the control panel; and
    an indicator light mounted behind the vacuum fluorescent display for optical communication between the indicator light and a diagnostic tool through the vacuum fluorescent display (VFD).

16. The appliance of claim 15 wherein the VFD includes a dark layer covering a glass substrate and a first aperture is formed in the dark layer.

17. The appliance of claim 16 wherein the first aperture is located approximately equidistant from four phosphor pixels in the VFD.

18. The appliance of claim 15 further comprising:
    a second indicator light mounted behind the vacuum fluorescent display for optical communication through the VFD.

19. The appliance of claim 18 wherein the first indicator light is operated as an optical transmitter and the second indicator light is operated as an optical receiver.

20. The appliance of claim 19, the vacuum fluorescent display further comprising:
    a dark layer covering a glass substrate; and
    a first aperture and a second aperture are in the dark layer so the first and second indicator lights are enabled for optical communication through the dark layer and the dark layer absorbs light not substantially aligned with either the first or the second aperture.

* * * * *

UNITED STATES PATENT AND TRADEMARK OFFICE
CERTIFICATE OF CORRECTION

| | | |
|---|---|---|
| PATENT NO. | : 7,095,333 B2 | Page 1 of 1 |
| APPLICATION NO. | : 10/667020 | |
| DATED | : August 22, 2006 | |
| INVENTOR(S) | : Graff | |

It is certified that error appears in the above-identified patent and that said Letters Patent is hereby corrected as shown below:

Title Page
The ASSIGNEE:

(73): replace "Company" with --Co.--

Signed and Sealed this

Twentieth Day of February, 2007

JON W. DUDAS
*Director of the United States Patent and Trademark Office*